United States Patent [19]
Bernard et al.

[11] Patent Number: 5,299,318
[45] Date of Patent: Mar. 29, 1994

[54] PROCESSOR WITH A PLURALITY OF MICROPROGRAMMED UNITS, WITH ANTICIPATED EXECUTION INDICATORS AND MEANS FOR EXECUTING INSTRUCTIONS IN PIPELINE MANNER

[75] Inventors: Christian Bernard, Les Clayes Sous Bois; Monika Obreska, Elancourt; Philippe Vallet, Lardy, all of France

[73] Assignee: Bull S.A., Paris, France

[21] Appl. No.: 620,472

[22] Filed: Nov. 30, 1990

[30] Foreign Application Priority Data

Dec. 21, 1989 [FR] France .................. 89 16952

[51] Int. Cl.$^5$ ............ G06F 9/30; G06F 9/22
[52] U.S. Cl. ............... 395/375; 395/500; 395/775; 395/800; 395/DIG. 1; 395/DIG. 2
[58] Field of Search .............. 395/375, 800, 775

[56] References Cited

U.S. PATENT DOCUMENTS

| | | | |
|---|---|---|---|
| 3,840,861 | 10/1974 | Amdahl et al. | 395/375 |
| 4,373,180 | 2/1983 | Linde | 395/375 |
| 4,539,635 | 9/1985 | Boddie et al. | 395/775 |
| 4,587,611 | 5/1986 | Amdahl et al. | 395/375 |
| 4,670,835 | 6/1987 | Kelly et al. | 395/575 |
| 4,773,035 | 9/1988 | Lee et al. | 364/748 |
| 5,125,092 | 6/1992 | Prener | 395/775 |

FOREIGN PATENT DOCUMENTS 0131658 1/1985 European Pat. Off.

OTHER PUBLICATIONS

IEEE Transactions on Computers, vol. c-27, No. 3, Mar. 1978 pp. 270-275, L. C. Higbie.
IEEE Transactions on Computers, vol. C 22, No. 2, Feb. 1973, pp. 149-153.

*Primary Examiner*—Parshotam S. Lall
*Assistant Examiner*—Viet Vu
*Attorney, Agent, or Firm*—Kerkam, Stowell, Kondracki & Clarke

[57] ABSTRACT

A data processing system having processors with large instruction sets optimized for the execution of brief instructions. The processor (CPU) comprises a plurality of microprogrammed execution units (EAD, BDP, FPP) communicating with one another and with a memory (MU) by way of a cache memory (CA). One of the units is an addressing unit (EAD). A second unit is a binary and a decimal calculation unit (BDP). A third unit is a floating point calculation unit (FPP) to permit the units to function autonomously, each unit includes its own command block and synchronizing means, for authorizing or interrupting the execution of the microprogram defined by the instruction in progress in said unit.

Each command block includes means for commanding instructions for triggering the execution of the microprogram of the first instruction in standby. The last microinstruction includes an end-of-microprogram indicator, and for certain units an anticipation indication, to condition the command means so as to authorize the execution of the microprogram of the instruction in standby before a preceding instruction has been fully completed.

21 Claims, 10 Drawing Sheets

PROCESSOR WITH A PLURALITY OF MICROPROGRAMMED UNITS, WITH ANTICIPATED EXECUTION INDICATORS AND MEANS FOR EXECUTING INSTRUCTIONS IN PIPELINE MANNER

CROSS-REFERENCE TO RELATED APPLICATIONS

The invention disclosed and claimed herein is related to the subject matter of the following commonly-assigned U.S. patent application, the entire disclosure of which is hereby expressly incorporated herein by reference:

Ser. No. 07/620,130, filed Nov. 30, 1990, concurrently herewith, by Thierry DOLIDAN et al, entitled "Processor with Multiple Microprogrammed Processing Units" corresponding to French application No. 89.15776.

BACKGROUND OF THE INVENTION

The invention pertains to the field of information processing systems and relates to a particular embodiment of processors that can be used in these systems.

Typically, an information processing system comprises a central subsystem that can communicate with one or more peripheral subsystems. The central subsystem is composed of one or more processors connected, for example by a bus, to a central memory and to one or more input/output units. The input/output units enable communication between the central subsystem and the peripheral subsystem.

The function of each processor is to execute program instructions contained in the central memory. To do this, a processor includes means for addressing the memory, in order to access the instructions and data necessary for processing information. To shorten the mean access time to these instructions and data, the processors are typically provided with a cache memory that serves as a buffer between the central memory and the processing circuits of the processor.

For small systems, in modern very large scale integrated technology or VLSI, the processing circuits of the processor can all be integrated into a single integrated circuit, or chip. For less powerful processors, contrarily, despite the steadily increasing scale of integration, the circuits of the same processor must be distributed among a plurality of integrated circuits. To this end, the processor is subdivided into a plurality of functional units, each of which corresponds to one or more integrated circuits. Thus each integrated circuit of the processor can comprise a specialized processing unit, which contributes to executing the set of machine instructions that the processor can execute. Naturally, each processing unit must be capable of communication with the central memory by way of the cache memory. Moreover, depending on the functional format selected, specific links must be provided that enable communication among these units.

Among the set of processing circuits included in the various units of the processor, distinctions are typically made between a command portion, often called a "command block", and a processing portion, generally called the "data path". The command block drives the addressing circuits and the data path as a function of the instructions received. The addressing circuits command the cache memory to drive both the transfer of the instructions and operands to the processing circuits and the transfer of the results processed by these circuits to the cache memory.

In the case of processors having a large instruction set, the microprogramming technique is generally used for the command block. The command block then essentially comprises a hard-wired microsequencer associated with a microprogram memory. As a function of the operating code of the instruction to be executed and of the logic state of the processor, the microsequencer executes an addressing of the microprogram memory, generally upon each cycle. At its output, the memory furnishes microprogram words that trigger the sending of command signals to the various circuits. Naturally, the command block may also include entirely hard-wired circuits, especially for executing certain functions for which faster optimization is desired.

A typical solution for making the microprogrammed command blocks of a processor is to provide a unit specialized for this function. The command block is then contained entirely within this unit, which may be in the form of an integrated circuit, generally associated with one or more external microprogram memories. European Patent Application Serial No. 85 113207.6, published as No. EP-A-17861 on Apr. 23, 1986, and entitled "Distributed Control Store Architecture", may be mentioned as an example of such a command block.

In this version, each processing unit is commanded in centralized fashion in the command block. As a result, each unit contributes at every moment to the execution of the same microinstruction. It has been seen that the various processing units of the processor are equivalent to sharing the set of processor functions.

For example, a first unit will be assigned the addressing function; another unit will be assigned the logical and digital and decimal arithmetic processing functions; a third unit will be assigned the floating point operations. With this type of functional format, the execution of an instruction, that is, of an associated microprogram, generally does not require the simultaneous effective functioning of these three units. For example, if the instruction comprises adding an operand contained in memory to the contents of a register of the processor and arranging the result in this register, its execution includes the following steps:

1) calculation of the real address of the operand from the logical address defined by the instruction;
2) addressing of the memory, loading the operand into the calculation unit, and execution of the operation;
3) writing the result in the register.

In this example, it can be seen that only the addressing unit is used during step 1, and only the calculation unit is used during steps 2 and 3. Thus when one unit is working the others are inactive, which does not represent optimal utilization of the equipment.

The object of the invention is accordingly to overcome these disadvantages, by proposing a processor with multiple microprogrammed processing units capable of functioning with maximum autonomy, to enable optimizing the use of these units and in particular to allow pipeline functioning, in which a plurality of units simultaneously execute microprograms for executing different instructions.

However, the absence of centralization of the command block must be compensated for by a mechanism for synchronizing the microprograms of the various units so that they run in an order determined so as to properly perform the precise functions that correspond to the instructions. The solving of this problem was the subject of French Patent Application 89 15776, filed on Nov. 30, 1989, and entitled "Processeur à plusieurs unités de traitement microprogrammeés" [Processor with Multiple Microprogrammed Processing Units], corresponding to U.S. application Ser. No 07/620,130,filed Nov. 30, 1990.

In this context of a processor with a plurality of microprogrammed units, the implementation of pipeline functioning requires that each unit be capable of detecting the beginning and end of each instruction and determining at any moment whether it can execute its microprogram corresponding to the execution of the following instructions.

With this object, the subject of the invention is a processor for a data processing system including a plurality of microprogrammed processing units, sharing the set of functions of the processor, each unit being assigned to the execution of a subset of functions of the processor, the units being connected to memory means containing the instructions of the programs to be executed and the operands, at least one of the units being a unit for addressing the memory means for obtaining the instructions and the operands, the processor being characterized in that the units include their own command block for the execution of specific microprograms; that each instruction is composed of a plurality of microprograms that can be executed respectively in the units; that the command block of each unit includes means for commanding instructions to trigger the execution of the microprogram of the first instruction waiting; that the last microinstruction of each of the microprograms includes an end-of-microprogram indication; that certain units and in particular the addressing unit include anticipation means and contain microprograms, the last microinstruction of which includes an anticipation indication to signal whether the following instruction to be executed can be anticipated; and that the anticipation means condition the command means to authorize the execution of the microprogram of the instructions in standby when the microinstruction in progress includes the end-of-microprogram and anticipation indications.

It is understood that the anticipation indication must be provided at the time the microprograms are designed, taking into account certain microprogramming rules associated with the operating format selected. For example, if an instruction is completed in a given unit, the last microinstruction of the corresponding microprogram in each unit need not contain the anticipation indicator. In other words, the next instruction is not anticipatable. The same applies for units that are precluded from functioning with anticipation.

To improve performance, it is advantageous to limit the number of cases requiring in advance that the next instruction not be anticipatable.

To this end, and in a preferred embodiment of the invention, the processor is further characterized in that it includes means permitting the units to exchange end-of-microprogram signals in response to the end-of-microprogram indications; that each unit includes an end-of-instruction detection circuit furnishing an end-of-instruction signal as a function of the end-of-microprogram signals; that each unit includes an inhibition circuit which when it is in its active state prevents any modification of the logic state of the unit; and that this inhibition circuit is in particular made active when the following conditions prevail in combination:

the anticipation indication is absent;
the end-of-microprogram indication is present;
the end-of-instruction signal is absent; then the instruction in standby is called "executable" if the end-of-microprogram indication is present while the inhibition circuit is inactive.

In another aspect of embodiment of the invention, the processor is characterized in that each unit provided with anticipation means includes an anticipated state indicator that initially assumes a first predetermined value and for a second predetermined value signals that the instruction in progress in the unit is executed in anticipation, that is, the execution of which has begun before the previous end of instruction; that the units include an effective-end-of-instruction detector circuit furnishing an effective-end-of-instruction signal when the following conditions pertain, in combination:

the end-of-instruction signal is present;
the unit is in an anticipated state, or the instruction in standby in the unit is the next instruction to be executed;

that the anticipated state indicator is put at the predetermined second value when the following conditions are present in combination:

the instruction in standby is executable;
the anticipation indication is present;
the effective-end-of-instruction signal is absent;

and that the inhibition circuit is made active when the following conditions are simultaneously met:

the end-of-microprogram indication is present;
the anticipation indication is absent;
the anticipated state indicator has the second predetermined value.

For certain types of instructions that can be executed by the processor, a dependency potentially exists between the instruction that is ending and the next instruction capable of being executed in anticipation in a given unit. Such a dependency exists, for example, in the case where the next instruction is a conditional transfer of control instruction while the parameters enabling the calculation of the transfer of control conditioned for this instruction can be modified by one of the preceding instruction that have not yet been completed.

To solve this problem, and in another aspect of the invention, the processor is characterized in that the addressing unit includes dependency detection circuits furnishing a dependency signal when the instruction in standby must use information capable of being modified by an instruction that has not yet been completed in at least one of the units other than the addressing unit; that the dependency signal conditions the activation of the inhibition circuit; and that the activation of the inhibition circuit is cancelled when the dependency signal disappears.

BRIEF DESCRIPTION OF THE DRAWINGS

Further characteristics and details of the embodiment of the invention will be described in the ensuing description, taken in conjunction with the drawings.

DESCRIPTION OF THE PREFERRED EMBODIMENTS

Figure 1:
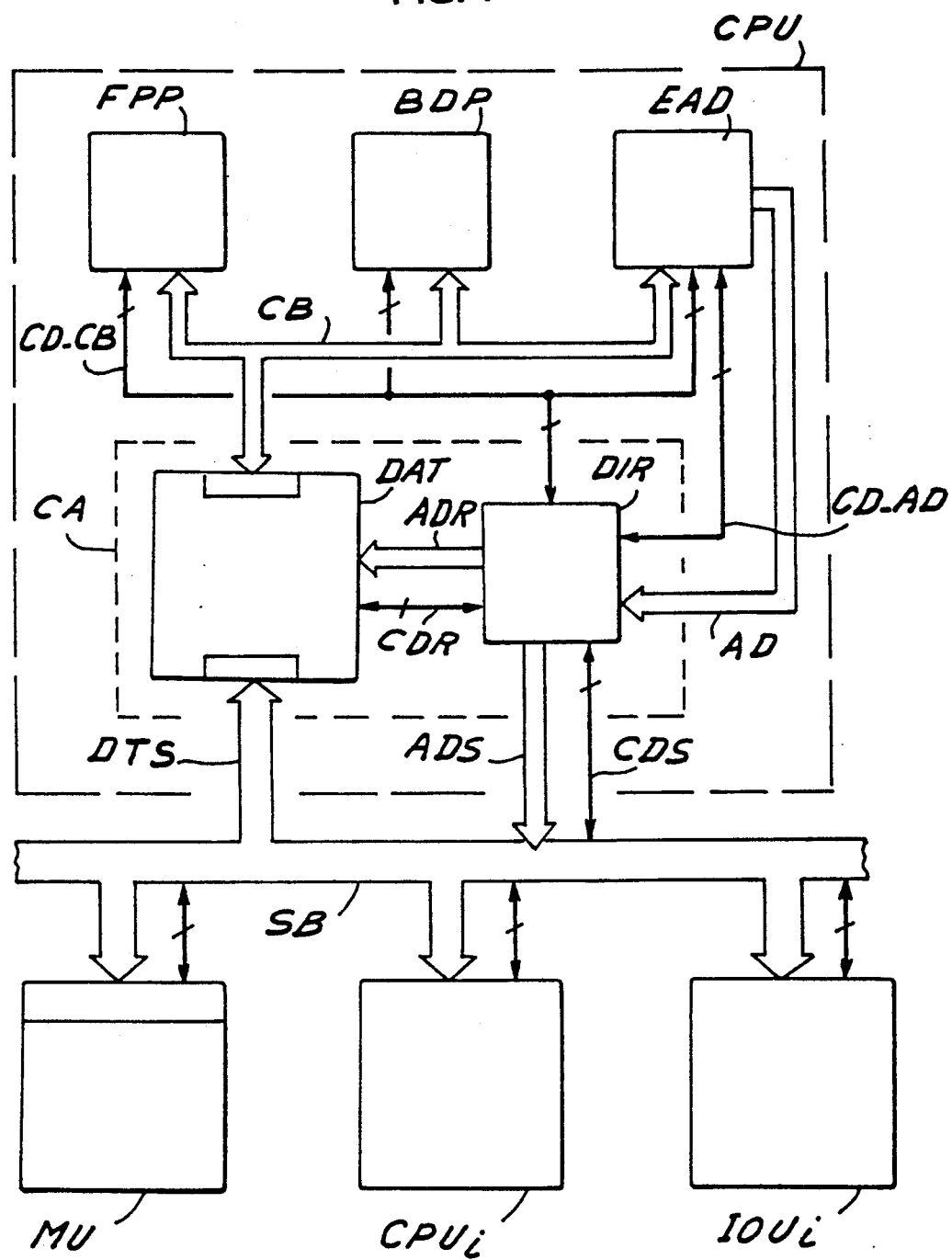
FIG. 1 shows an information processing system including the processor according to the invention.

The system of FIG. 1 comprises a plurality of processors CPU, $CPU_i$ connected to a system bus SB in such a way as to be capable of communication with one another and with a central memory MU and with the input/output unit $IOU_i$. The number of processors $CPU_i$ and input/output units $IOU_i$ may be variable, as may be the number of memory modules comprising the central memory MU. All these elements form what is called the central subsystem of an information processing system capable of communicating with one or more peripheral subsystems (not shown) by way of the input-/output units $IOU_i$.

FIG. 1 shows within a block CPO outlined by dash lines the main components of one of the processors in more detailed fashion. This processor is connected to the system bus SB by way of a cache memory CA outlined in dash lines and serving as a buffer between the central or main memory MU and the execution units EAD, BDP, FPP of the processor. The cache memory CA substantially comprises memory circuits DAT of lesser capacity than the central memory MU, and a controller DIR for managing the interfaces with the system bus SB, on the one hand, and the execution units EAD, BDP and FPP, on the other. These units and the controller may be embodied as VLSI chips. The memory circuits DAT exchange the data with the system bus SB by way of data lines DTS. The controller DIR communicates with the bus SB via address lines ADS and command lines CDS.

As a non-limiting example of an embodiment, one of the execution units EAD is assigned specifically to the addressing operations, particularly for obtaining instructions and operands from the cache memory CA. The unit EAD is then connected to the controller DIR by address lines AD that carry the calculated real address signals. The unit EAD and the controller DIR are also operatively connected to one another by address control signals via associated control lines CD-AD. These address and control signals are taken into account by the controller DIR to command the memory circuits DAT in turn, by way of address lines ADR and internal control lines CDR. In response to this information, the memory circuits DAT can exchange the instructions, operands and results with the execution units EAD, BDP, FPP by way of lines CB.

Since the processor according to the invention has execution units capable of autonomously executing their own microprogram, these units are connected to one another and to the controller DIR by way of control lines CD-CB in such a way as to enable synchronization and coherence of the operations executed in these units.

In the example shown, the execution is confined to three units, which share the following functions:
translation of virtual addresses into real addresses, and addressing of the cache memory, for EAD;
binary and decimal calculations, for BDP;
floating point calculations (scientific calculations), for FPP.

It should be noted that the invention is not limited to this particular functional format. Also, for the sake of simplicity, FIG. 1 shows neither the clock circuits nor the associated maintenance devices.

Aside from the particular role of the information and signals that the units exchange with one another and with the cache memory, the system of FIG. 1 performs like a conventional system. Hence there is no need to describe the known aspects of its function, and the ensuing description will be devoted to the aspects directly connected with the invention.

The embodiment that will now be described takes the form first of the particular interfaces of the cache memory and the corresponding interfaces of the units, along with the associated links. These elements will be described in conjunction with FIGS. 2 and 3.

Figure 2:
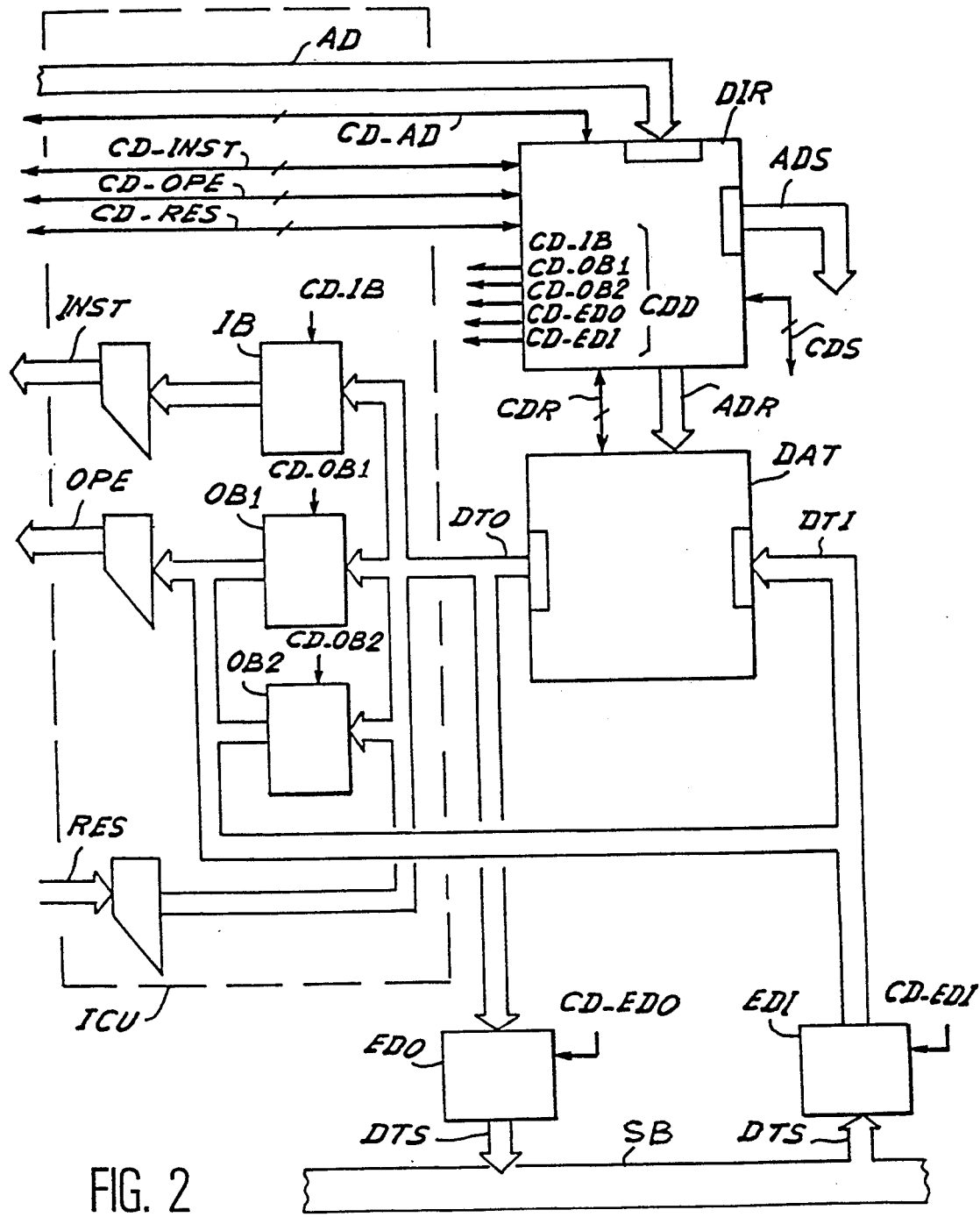
FIG. 2 shows a cache memory and its circuits that interface with the processing units of the processor, in a preferred embodiment of the invention.

FIG. 2 shows the cache memory CA, which includes the controller DIR, connected to EAD by the lines AD and CD-AD, and the memory circuits DAT. The cache memory CA communicates with the three execution units by way of a set of interface circuits ICU, shown within dash lines and three buses INST, OPE, RES, and the associated control lines CD-INST, CD-OPE, CD-RES, respectively, to which the three execution units are connected.

The bus INST is assigned to transferring instructions between the memory DAT and the units. The output DTO of the memory DAT is connected to the bus INST by way of an instruction buffer IB and a justify or shifter circuit.

The buses RES and OPE are assigned to transferring the results and operands, respectively. These buses are respectively connected to the output DTO and the input DTI of the memory DAT by way of buffers OB and OB2 and justify or shifter circuits. The buffers IB, OB1, OB2 can be loaded from the memory DAT in response to the reading commands CDR of the controller DIR. Finally, the input DTI and the output DTO of the memory DAT are connected to the data lines DTS of the system bus SB, via an input buffer EDI and an output buffer EDO, respectively.

The buffers IB, OB1, OB2, EDO, EDI are commanded respectively by the signals CD-IB, CD-OB1, CD-OB2, CD-EDO and CD-EDI furnished by the controller DIR. These signals serve to select reading or writing of the various registers of these buffers upon data transfer to or from the memory DAT and to or from the execution units.

The functioning of the cache memory for the internal operations relating to the system bus SB is to a great extent conventional. However, it may be useful to recall that the address information and the associated commands furnished by the addressing unit EAD are taken into account by the controller DIR in order to search in an internal associative memory (called a directory) whether the data corresponding to the address received are indeed present in the memory DAT. If so, the controller DIR directly addresses the memory DAT and commands the operations of reading or writing. If not (in the case of a "miss"), the controller triggers a reading operation in the central memory MU by means of address and command signals transmitted by the lines ADS and CDS, respectively. Once the updating of the memory DAT has been completed, the exchanges of data with the processing units resume in normal fashion.

It should be noted that these updating operations are invisible to the processing units. They simply translate into the presence of a busy signal BUSY sent by the controller DIR to the processing units.

Particular embodiment aspects of the invention relate to the exchanges between the cache memory and the processing units. An explanation on this subject will be given in conjunction with FIG. 4, but first the organization of the execution units should be described.

Figure 3:
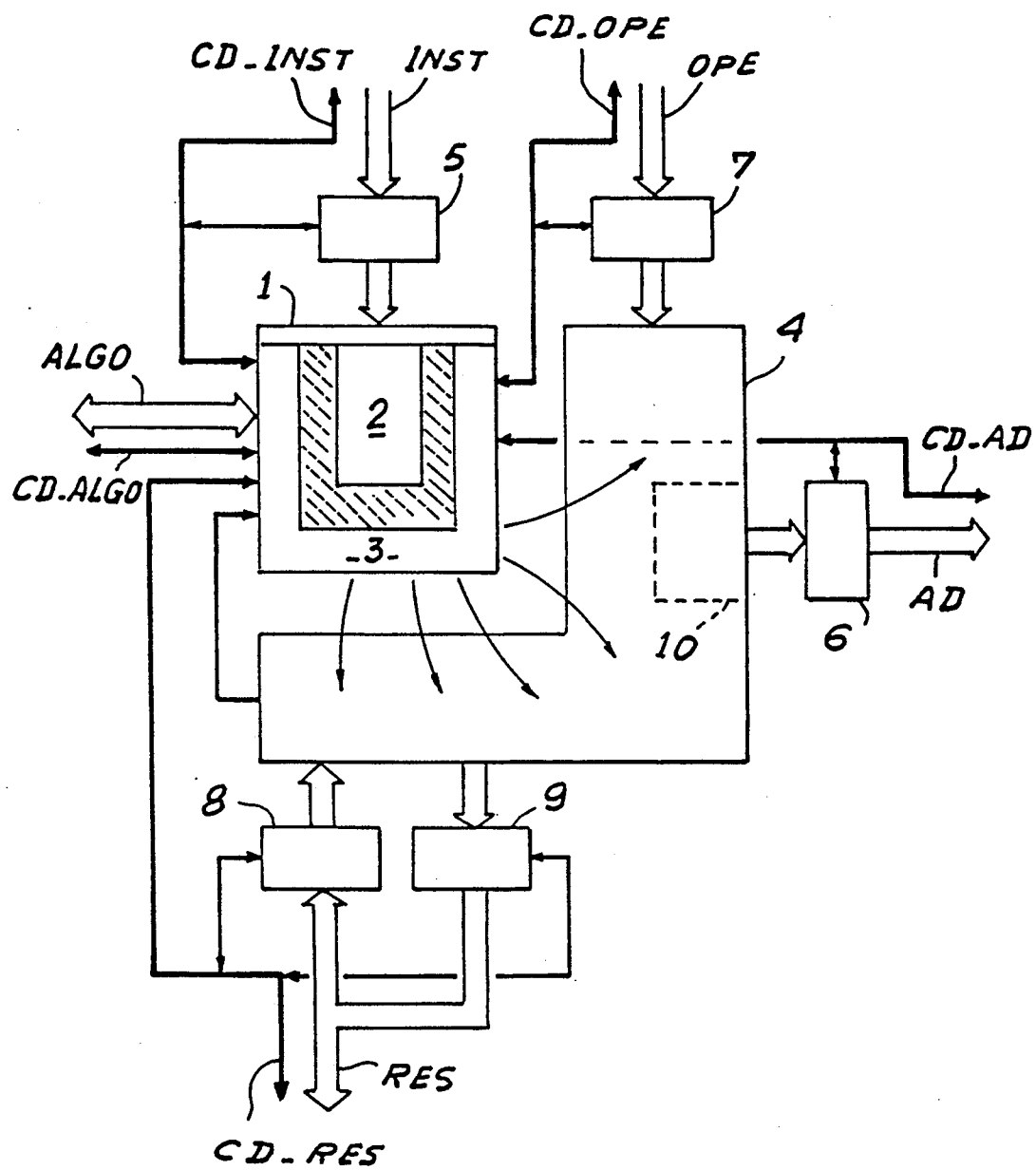
FIG. 3 schematically shows a processing unit of the processor of the invention.

FIG. 3 schematically shows the primary subassemblies comprising the addressing units EAD. The links AD, INST, OPE, RES mentioned above are found here. These links are connected to the unit by way of buffers 6, 5, 7, 8 and 9, respectively, which serve to temporarily store the addresses, instructions, operands, results received, and results to be sent which the unit exchanges with the cache memory or the other units.

Like any microprogrammed unit, it may be subdivided into two major portions: a control portion or command block 1, and an operative portion or data path 4.

The command block 1 includes an execution portion for microprograms 2 associated with a hard-wired portion 3, which cooperate with one another to manage the execution of the instructions received, and generally to perform "system" operations specifically confined to the microsoftware or microprogramming and to the hardware.

The data path 4 typically comprises hard-wired operators and registers, which can be either visible or invisible to the software and are necessary for executing instructions. These resources are controlled by means of a multitude of signals issued by the command block 1.

The command block 1 is also connected to a supplementary bus known as an algorithm channel ALGO, to which the other units are connected. This bus, which is associated with command lines CD-ALGO, will be the subject of later explanation hereinafter given.

The other execution units BDP, FPP have an organization similar to the addressing unit shown in FIG. 3. The units BDP and FPP are clearly distinguished from the addressing unit EAD by the absence of a buffer addressing interface 6 connected to the lines AD and CD-AD. On the other hand, only the unit EAD has the specific circuits 10 outlined in dash lines in data path block 4 of FIG. 3 for calculation of real addresses in its operative portion. Taking their different functions into account, the three units contain different microprograms, and each has means for decoding corresponding specific microfunctions.

In the example described, the set of functions of the processor is shared among the three units EAD, BDP, FPP in the following manner:

EAD is assigned to address development, making it possible to calculate the virtual addresses as a function of the address field of the instructions received. It translates these virtual addresses into real addresses and transmits the commands and real addresses to the cache memory. The operations trigger the simultaneous loading of the instructions by the bus INST into the three units, or the sending of operands over the bus OPE to the units that need them. EAD also participates by its addressing function, in the operations of writing into memory the results processed by the other units and transmitted over the bus RES. Another important function is the management of the instructions to be loaded. To execute these functions, the data path 4 includes base registers BR, general registers GR, instruction counters IC, and a certain number of working registers WR. A first adder is also provided, to calculate the virtual address from the contents of the base registers, the contents of one of the general registers, and a displacement value furnished by the instruction being executed at that time. A second adder is assigned particularly to updating the instruction counters. Finally, the data path is provided with a circuit AC to accelerate translation of the virtual addresses into real addresses.

The unit BDP is a binary and decimal calculation unit that also includes not only general registers and working registers, but also certain specialized operators such as a binary adder, multiplier, Boolean operator, shifter, and decimal adder. These resources can serve not only to perform decimal binary operations defined by the instructions to be executed but also to subprocess certain auxiliary calculations on the demand of the addressing unit EAD, such as index calculations, in order to perform addressing, or calculations of the transfer of control conditions, in the case of instructions for conditional transfer of control.

The unit FPP is a scientific calculation unit enabling the operations of addition, subtraction, multiplication, and division bearing on the operands formatted with a floating point. Its data path includes large-capacity scientific and working registers and high-performance operators assigned to perform the above calculations. Naturally, the unit FPP also includes means for converting the binary representation of numbers into floating point representation, and vice versa. Hence the unit FPP is capable of executing scientific instructions, and it may also be assigned to subprocess certain operations, such as complex multiplication or division, upon demand of the unit BDP.

Since each unit is microprogrammed in such a way that it can autonomously execute specific microprograms corresponding to the instructions to be executed, each command block includes its own microprogram memory, its own microsequencer, and a set of associated logic circuits. All these elements will be described in further detail in conjunction with FIG. 5.

This microprogramming shared by a plurality of units requires means for synchronizing the microprograms that are executed simultaneously in the three units. This synchronization is implemented by means of the control lines CD-INST, CD-OPE, CD-RES and CD-ALGO. These links will now be defined and their functions described in detail, in conjunction with FIG. 4.

Looking to the right-hand portion of the figure, the interfaces of the controller DIR associated with the lines CD-AD, CD-INST, CD-OPE and CD-RES are seen. The left-hand portion of the drawing shows the corresponding interfaces of one of the execution units U1, to which the control interface CD-ALGO associated with an algorithm channel ALGO is added. In order not to make the drawing more complicated, only one unit U1 is shown, but it is understood that this unit may be either EAD, BDP or FPP. By convention, the other units will be called U2 and U3. However, given the particular role of the unit EAD, certain parts of its interface will be specific to that unit (U1=EAD), while others will be specific to the other units (U1=BDP/FPP).

The operations of addressing the memory DAT that are commanded by EAD use the lines CD-AD, which include the command lines CMD enabling EAD to send corresponding command signals. The command signals CMD serve to initialize certain operations, or memory access, that can be executed by the cache memory. The set of commands for these operations may be encoded over a plurality of bits carried by a plurality of CMD lines. As commands to be provided, the following can be named: the instruction reading command CIIR or operand reading command IOR, the operand writing command IOW, and commands for suspending operations and resuming previously suspended operations. These command lines are associated with length indicator lines LG for indicating to the cache memory, as a complement of the address, the number of bytes involved in a reading or writing command. Other lines serve to carry complementary signals such as an address validation signal, a termination signal or a signal for validating commands (not shown), along with the busy signals BUSI sent by DIR to indicate to EAD whether the cache memory is ready or not to execute commands, for example in the case of reloading from the central memory after a "miss".

Among the signals CD-INST associated with the instruction bus INST, some of them concern only the addressing units EAD: INST-SEND sent by DIR, to signal to EAD that the cache memory is sending an instruction; INST-GOT send by EAD to signal to the cache memory that an instruction previously sent has been effectively received; IIR to signal to the other units BDP, FPP that an instruction reading command CIIR has been sent to the cache memory. A transfer of control validation line BRVA connects the three units and the controller to one another. A signal BRVA can be sent (in the case of a transfer of control instruction) by one of the units BDP or FPP, to indicate to the other units and to the controller DIR whether a conditional transfer of control is effective or not. The signal BRVA is used by the receiving units and the controller to validate the instruction reading initialization signals CIIR, IIR sent by the addressing unit EAD. The three units are finally connected to one another by three end-of-instruction execution lines END1, END 2, END3. Via these lines, the units U1, U2, U3 can send the signals END1, END2, END3, signalling that they are executing the last microinstruction of the execution microprogram in progress, to the other two units. As will be described below, these signals will serve to synchronize the execution of instructions in each unit.

The control lines CD-OPE associated with the operand bus OPE include a line for notification of operand sending SEND, enabling the controller DIR to signal to the three units that it is sending an operand over the bus OPE. The three units of the controller DIR are also connected to one another via a reception acknowledgement line GOT, which enables each unit to send to DIR a signal acknowledging receipt in response to the sending signal SEND. The signal GOT is sent by the addressee unit for the operand. To assure the coherence of the transfers, the receiving unit cannot effectively send the signal GOT unless it is the owner of the bus OPE (specifically represented by the logic state of a multivibrator OPE-U1-OWN), i.e., has captured bus OPE.

An ownership transfer bus OPE-OWN connects the three units with one another, to allow the unit owning the operand bus to indicate the new owner of this bus. When a change of ownership must be effected (a situation provided in the microprogram of the owner unit, as a function of state parameters), the owner unit sends, over OPE-OWN, signals encoded as a function of the identity of the new owner unit. These signals are received by the other two units, and the receiving unit that is recognized as the new owner of the operand bus (by decoding of these signals) memorizes this situation (OPE-U1-OWN set to 1), which then authorizes the sending of the reception acknowledgement signals GOT and the ownership signals OPE-OWN. In summary, the signals CD-OPE employ an ownership mechanism for reception of the operands.

Unlike the operand bus, the result bus RES is managed by a sending ownership mechanism. The ownership of the result bus is specifically represented in each unit by the logic state of an ownership multivibrator RES-U1-OWN, the logic state of which either authorizes or prohibits the sending of a result to the unit.

The implementation of this mechanism uses the control line CD-RES defined as follows. An availability line GET of the cache memory connects the controller DIR to the three units and is used by it to send an availability signal signifying that at least one of its buffers OB1 or OB2 is empty. Analogously, links EMPTY connect the three units to one another, to enable the units that are not owners of the result bus (RES-U1-OWN=0) to inform the other units, and in particular the owner unit of the result bus, that they are ready to receive a result, or in other words that their results input buffer 8 (FIG. 3) is empty. A line of the RES-CA bus type for notification of the sending of a result connects the three units and the controller DIR to one another. The line RES-CA enables the result bus owner to send a result sending signal, to inform the controller DIR that a result intended for the cache memory has been sent. The three units are also connected to one another, via another bus-type line RES-CP for notification of sending a result from one unit to another unit. This line RES-CP is associated with an addressee bus DEST, which also connects the three units to one another. The bus DEST enables carrying an encoded signal making it impossible to identify the addressee of the result when the sending is signaled by RES-CP. The sending of signals over the lines RES-CA, RES-CP, DEST is conditioned by the state of the ownership multivibrator RES-U1-OWN. The state RES-U1-OWN also conditions the sending of change of ownership signals over an ownership transfer bus RES-OWN of the result bus. The bus RES-OWN connects the three units to one another and is used analogously to the bus OPE-OWN described above.

The algorithm channel ALGO is used for exchanges of information on transfer of control of the microprograms. This channel is useful because of the fact that transfer of control microinstructions are used in the microprograms of the units when the transfer of control conditions are determined by only one of these units. Hence the unit that determines the effective transfer of control must inform the other units, which can be achieved by means of this specific channel.

The mechanism of sending ownership is also used for the algorithm channel ALGO. The owner or captor of the channel ALGO (ALGO-U1-OWN=1) is authorized to send transfer of control signals of the microprogram, and the presence of this kind of sending is signaled by a transfer of control condition sending signal over the lines ALGO-SEND, connecting the units capable of using this information to one another. This sending is conditioned by a signal of availability of the addressee, sent over the lines ALGO-EMPTY. Naturally, only the non-owner or non-captive units (ALGO-U1-OWN=0) of the algorithm channel are authorized to send this availability signal. Finally, as was the case for the operand bus and the result bus, the ownership or capture of the algorithm channel can be changed by its owner (ALGO-U1-OWN=1), via ownership or capture transfer lines ALGO-OWN, which connect the units to one another. In the simplified case where only the units EAD and BDP have a need to exchange this information, ALGO-SEND, ALGO-OWN and ALGO-EMPTY are each constituted by a single line.

Because of the signals described above that the unit and the cache memory can exchange, each unit can autonomously manage the execution of the instructions received. Naturally, the microprograms loaded into the various units must be designed taking these mechanisms into account. Furthermore, synchronizing circuits capable of intervening in the execution of the microprogram as a function of the signals must be provided in the hard-wired portion 3 of the command block.

Figure 5:
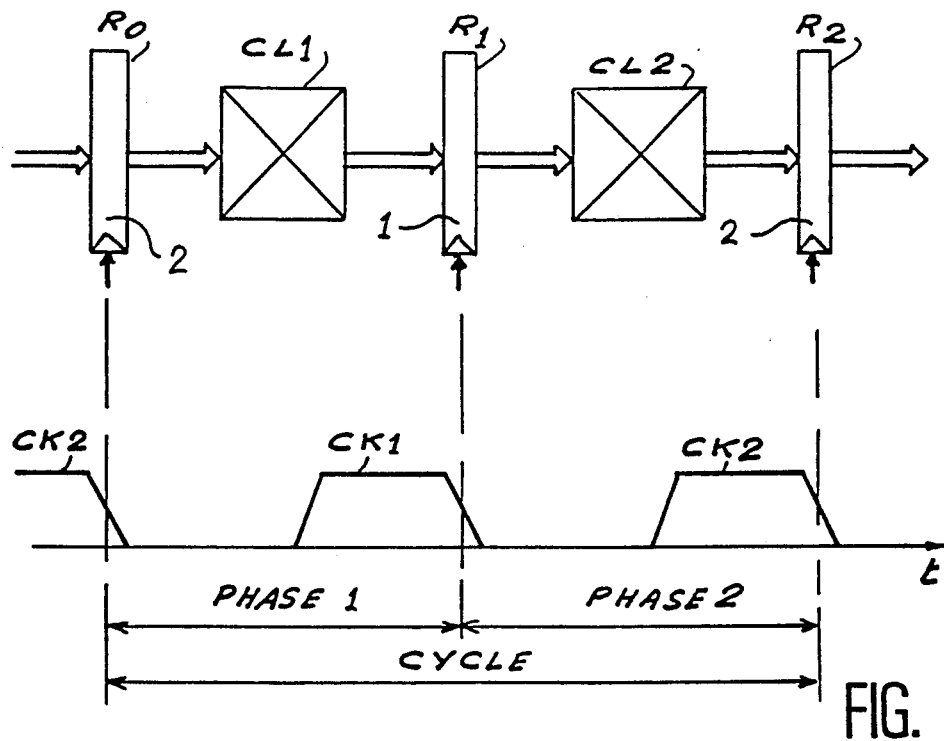
FIG. 5 illustrates the function of the circuits of the processing units, in two phases.
Figure 6:
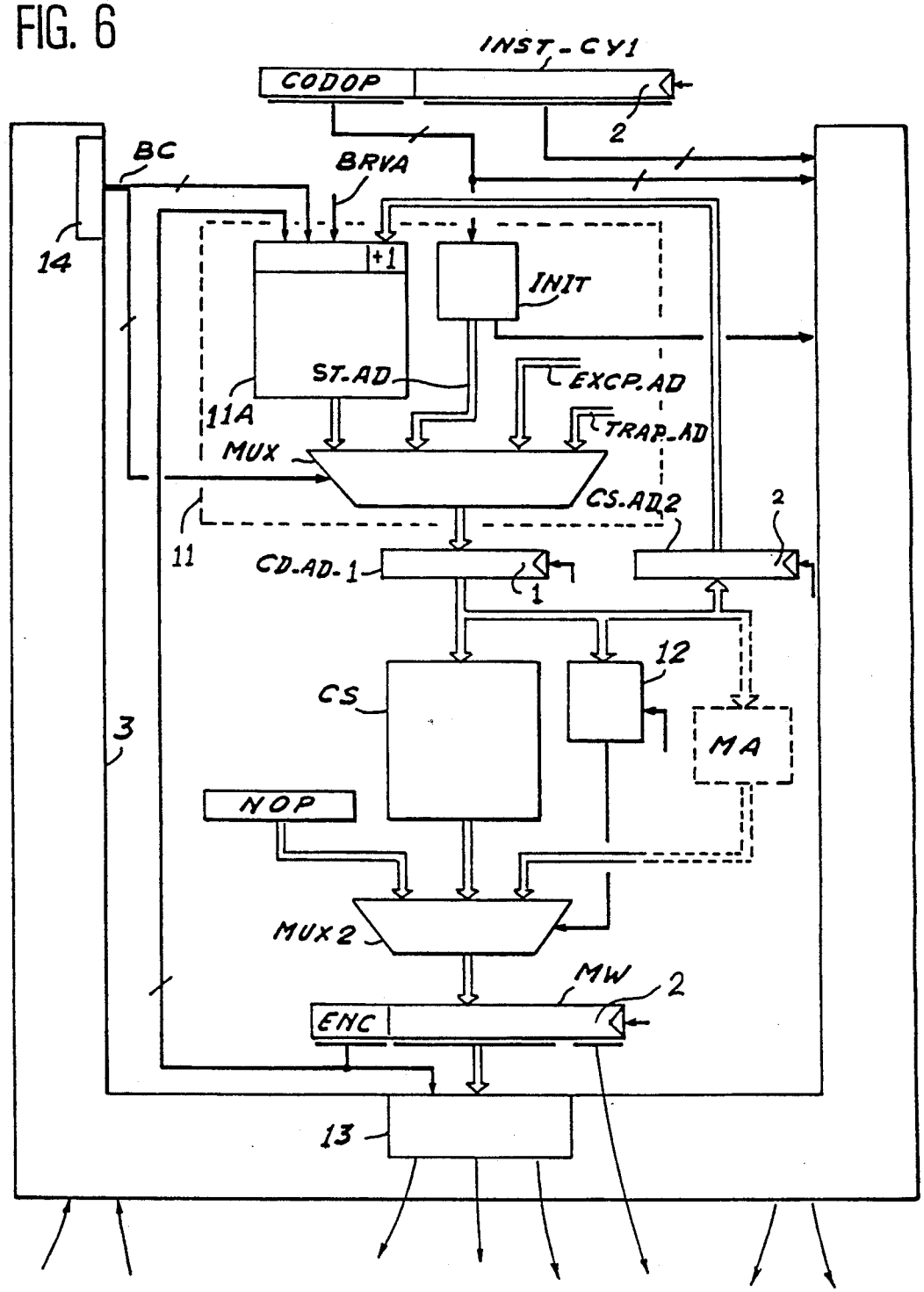
FIG. 6 shows the main elements of a command block of a processing unit for implementing the invention.

Before the synchronization circuits are described, the essential elements of the microprogrammed portions of the command block will be reviewed, referring to FIGS. 5 and 6.

FIG. 5 schematically illustrates the principle of sequencing the operations of the set of the processes, and in particular of the command block of each unit. This sequencing is achieved by means of clock signals CK1 and CK2 that define two successive phases PHASE 1 and PHASE 2; one cycle is defined as the succession of one phase 1 and one phase 2. As is apparent in FIG. 5, the circuits of one unit can be represented functionally as a cascade assembly of registers R0, R1, R2 and logic or combinatorial circuits of the CL1 or CL2 type, respectively evaluated in phase 1 or phase 2. The outputs of a logic circuit of the CL1 type are connected to the inputs of a downstream logic circuit of the CL2 type, by way of a register synchronized with the clock signal CK1 corresponding to the active phase 1. Similarly, the outputs of a circuit of the CL2 type are connected to the inputs of a downstream circuit (not shown) of the CL1 type, via a register R2 synchronized by CK2. Thus for the portion of the circuit shown by way of illustration, the circuit CL1 is active during phase 1 and acts on the input signals contained in the register R0 loaded during the preceding phase 2. The downstream circuit CL2 is active during the subsequent phase 2 and acts on the contents of the register R1 loaded during the preceding phase 1, and its result is loaded into the register R2 that is synchronized by the clock signal CK2.

The microprogrammed portion of FIG. 6 substantially comprises a microsequencer 11, outlined by dash lines, the output of which is connected to the input of the microinstruction address register CS-AD-1 synchronized by CK1. The output of this register is connected to the input of a microprogram memory CS. The register CS-AD-1 is also connected to the input of a register CS-AD-2 synchronized by CK2. This register serves to contain the address of the microinstruction being executed. The output of the memory CS is connected by way of a multiplexer MUX2 to the input of a register MW that is synchronized with CK2 and serves to contain the microprogram (or microinstruction) word normally furnished by the memory CS. The output of the register MW is connected to the hard-wired portion 3 of the command block and in particular to the decoder 13. The chaining field ENC of the register MW contains, in encoded form, the chaining microfunction associated with each microinstruction. The output lines of the register MW that correspond to the chaining field ENC are connected to the circuit 11A of the microsequencer 11 for calculation of the address of the ensuing microinstruction. The circuit 11A is also connected at its input to the output of the register CS-AD-2. Finally, from the subassembly 14 of the hard-wired portion 3, the circuit 11A receives signals BC representing the microprogram transfer of control conditions, in particular the signals arriving from the bus ALGO. These conditions are evaluated in phase 2 as a function of internal and external parameters. The circuit 11A also receives the transfer of control validation signal BRVA originating in another unit.

A current instruction register INST-CY1 synchronized by CK2 contains the instruction being executed. Its output is connected to the hard-wired portion 3 and to the input of an initializing circuit INIT, which is generally embodied as a read-only memory. As a function of the operating code CODOP of the instruction, the circuit INIT furnishes the address of the first microinstruction of the instruction execution microprogram.

A multiplexer MUX1 has a plurality of inputs comprising the output stage of the microsequencer 11. A first input is connected to the output of the circuit 11A, and a second input is connected to the output of the circuit INIT. The multiplexer MUX1 also receives at its input particular microprogram address signals, such as EXCP-AD or TRAP-ED, enabling detouring of the microprogram in the case of exceptions (EXCP) or specific events (TRAP). Under the command of transfer of control signals evaluated in phase 2 by the hard-wired portion 3, the multiplexer MUX1, in the course of the ensuing phase 1, selects the address of the microinstruction to be executed. This may be the first microinstruction of the instruction, a detour microinstruction, or the microinstruction defined by the circuit 11A upon normal running of the microprogram.

The output of the microinstruction address register CS-AS-1 can also be connected to an auxiliary external memory MA that serves to expand the capacity of the microprogram memory CS. In that case, the microprogram address is applied to a circuit 12 that enables detection whether the corresponding microinstruction is or is not contained in the internal memory CS. The output of the auxiliary memory MA is also applied to one of the inputs of the multiplexer MUX2. This multiplexer MUX2 is commanded by the circuit 12 in such a way as to select the output of the internal memory CS or the output of the auxiliary memory MA. The auxiliary memory MA may be a supplementary memory associated with the unit or optionally may be the central memory of the system, one zone of which is reserved for the microprograms.

Another input of the multiplexer MUX2 can receive a hard-wired microinstruction NOP, the execution of which does not change the logic state of the unit. The instruction NOP is activated when there is a need to keep the unit waiting, for example in the case where access to the auxiliary memory requires more cycles than does access to the internal memory.

The microinstruction contained in the register MW furnishes signals to the rest of the unit by way of a microinstruction decoder 13, in such a way as to drive all the resources of this unit and produce the signals exchanged with the outside. It is at the level of this decoding that the attribution and change of ownership signals that have been provided by microprogramming are especially produced.

In particular, in this way the first microinstruction for execution of an instruction determines each of the owner units of the buses OPE, RES and ALGO.

The command block of FIG. 6 is for the most part conventional in type, and so its function is well known to one skilled in the art. Hence there is no need to describe all the details of its function. However, it will be recalled that every new instruction loaded in phase 2 into the instruction register INST-CY1 is decoded by the initializing circuit INIT, which in the ensuing phase 1 furnishes the address of the first microinstruction. As a function of this address, the microprogram memory CS, in the ensuing phase 2, furnishes the first microinstruction from which the signals for commanding the resources of the unit are derived. During this same phase 2, the address of this microinstruction is loaded into the register CS-AD-2, to enable the unit 11A to calculate the address of the ensuing microinstruction as a function of the transfer of control signals BC processed during this phase.

From the standpoint of sequencing, it can be noted that the calculation of the address of a microinstruction is performed in phase 1 corresponding to a "reading" phase, while access to the microinstruction in the memory CS takes place in phase 2 corresponding to an "execution" phase. During this same "execution" phase, the register CS-AD-2 is loaded with the address contained in the register CS-AD-1, to prepare the microsequencer for calculating the address of the ensuing microinstruction. As a result, if the clock signal CK2 for executing phase 2 is inhibited, all the signals furnished to the microsequencer maintain their logic state unchanged, because the registers synchronized with CK2 have not been modified.

The above comment will now aid in explaining the means that can be used to achieve synchronization of the microprograms. For this purpose, FIG. 7 will now be described, which represents the circuit with which this synchronization is achieved.

Shown in this drawing figure is one of the registers $R_i$ synchronized with CK2. This register is commanded by an AND gate 19 with three inputs, two inputs comprise the clock signal CK2, and a microcommand signal mf generated by the decoder 13 as a function of the microinstruction MW. The third input of the AND gate 19 receives a signal NOEX* sent by a multivibrator 20. This multivibrator 20 is loaded in phase 1 with a signal furnished by a set of logic circuits 15, 16, 17, 18.

Figure 4:
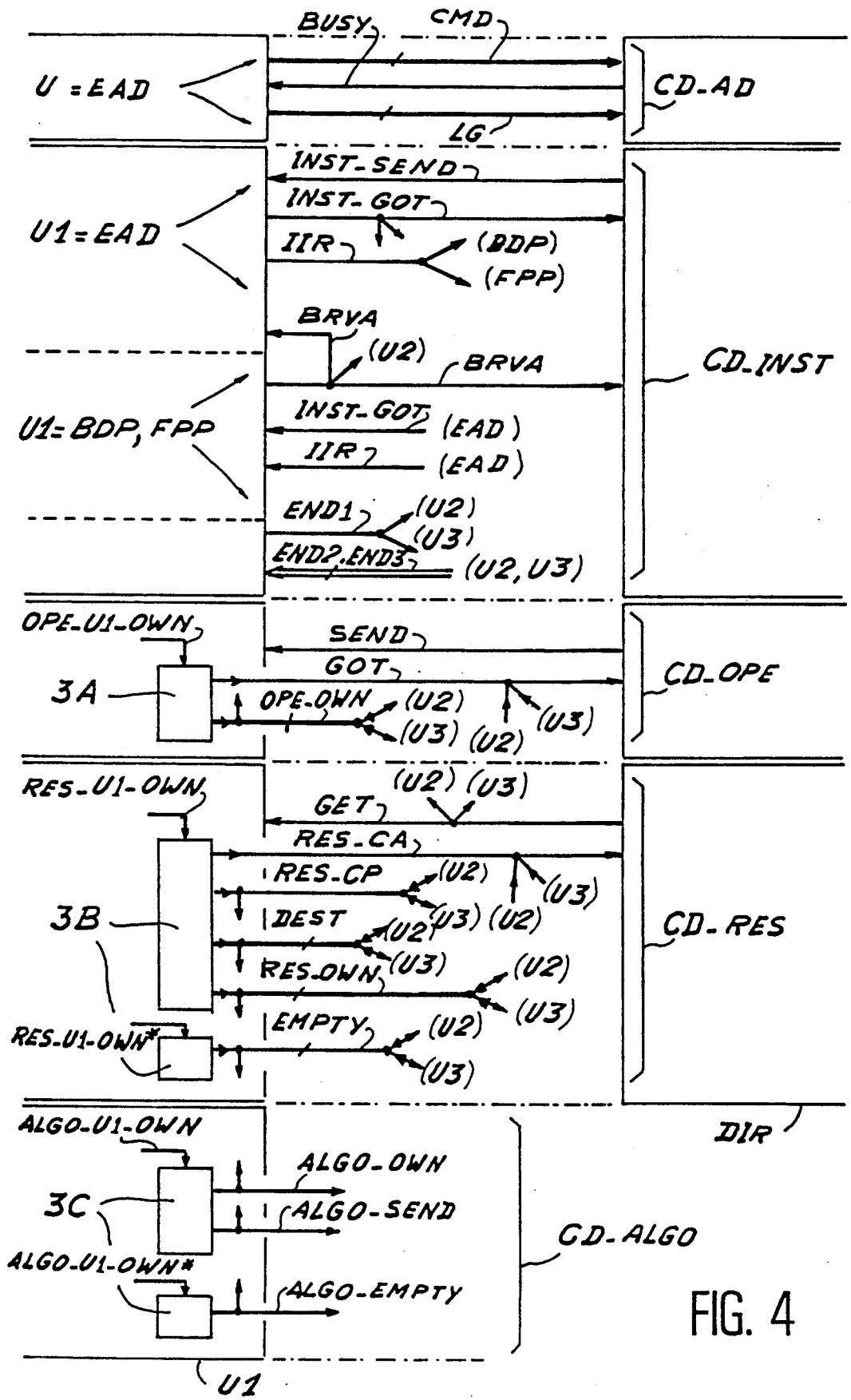
FIG. 4 shows the main signals exchanged among the processing units and with the cache memory.

The input signals of the circuits 16, 17, 18 that have already been introduced in the description of FIG. 4 will not be explained again here. However, it should be noted that they must be evaluated in phase 1 of a cycle.

The signals OPE-REC, RES-REC, RES-SEND obtained by decoding of the microinstruction being executed assumes the value of logical 1, when the unit is expecting an operand (OPE-REC), the unit is extending a result (RES-REC), and the unit seeks to send a result (RES-SEND), respectively.

The logic circuit 15, which plays the role of an inhibition circuit for the unit, performs the NOT-OR ("NOR") function applied to a plurality of signals each of which defines a condition of nonexecution of the microinstruction in progress. In particular, it receives the output signals of the circuits 16, 17 and 18 that will now be described.

The signal NOEX-OPE furnished by the logic circuit 16 corresponds to the condition of nonexecution produced in the case where the unit expects an operand (OPE-REC=1) at a time when the cache memory is not signaling that it is sending an operand (SEND=0), or when the unit is not the owner of the operand bus (OPE-U1-OWN=0), which is summarized by the following logical equation:

NOEX-OPE=(OPE-REC)·[SEND*+(OPE-U1-OWN)*], where the symbol * represents the complement of the logical variable (by the convention of positive logic).

A signal NOEX-RES-REC furnished by the logic circuit 17 corresponds to a nonexecution condition that is imposed in the case where the unit U1 expects a result (RES-REC=1) at a time when the sending of this result by another unit has not been signaled (RES-CP=0), or when the unit is not recognized as an addressee of the result sent (U1-DEST=0). The corresponding logical equation is:

NOEX-RES-REC=(RES-REC)·[(RES-CP)*+(U1-DEST)*].

The signal NOEX-RES-SEND furnished by the logic circuit 18 corresponds to the following cases of nonexecution:

1) the unit U1 must send a result to the cache memory or to some other unit (RES-SEND-CA, or RES-SEND-U2, or RES-SEND-U3=1), at a time when the unit U1 is not the owner of the result bus (RES-U1-OWN=0);

2) the unit U1 must send a result to the cache memory (RES-SEND-CA=1), at a time when the cache memory is not ready to receive the result (GET=0);

3) the unit U must send a result to one of the other units U2 or U3 (RES-SEND-U2 or RES-SEND-U3=1) at a time when the addressee unit is not ready to receive the result (EMPTY-U2 or EMPTY-U3=0). These conditions are summarized by the following logical equation:

NOEX-RES-SEND = (RES-SEND-CA +
RES-SEND-U2 + RES-SEND-U3) ·
(RES- U1-OWN)* +
(RES-SEND-CA) · GET* +
(RES-SEND-U2) · (EMPTY-U2)* +
(RES-SEND-U3) · (EMPTY-U3)*

The signal NOEX-ALGO corresponds analogously to the nonexecution conditions resulting from the impossibility on the part of the unit U1 to send a transfer of control datum that it should send or to receive an expected transfer of control datum. As a function of the signals defined in FIG. 4, the following equation applies:

$$NOEX\text{-}ALGO = (ALGO\text{-}SEND) \cdot [(ALGO\text{-}OWN)^* + ALGO\text{-}EMPTY] + (ALGO\text{-}REC) \cdot (ALGO\text{-}SEND)^*$$

where ALGO-REC is an internal signal for the unit that assumes the value of logical 1 when the unit U1 is expecting a transfer of control datum.

According to the invention, the circuit 15 receives other nonexecution signals, such as NOEX-ST corresponding to the case where it is impossible to initiate the execution of the ensuing instruction or NOEX-ANT (which is specific to the units provided with anticipation means) that prevents this unit from executing the ensuing instruction in the anticipated mode. These signals and the circuits that produce them will be described hereinafter, in conjunction with FIGS. 10 and 11.

The function of a unit when the synchronizing mechanism of the invention intervenes will now be described. For this purpose, reference is made to FIG. 6, assuming that phase 2 of an execution cycle has just ended. The logical state of the unit is then as follows: The active registers in phase 2, CS-AD-2 and MW, have just been loaded with new values, while the register CS-AD-1 retains the value that was loaded during the preceding phase 1. Aside from the case where a new instruction is to be executed (the ST microfunction described hereinafter), the register INST-CY1 keeps the same value.

Figure 7:
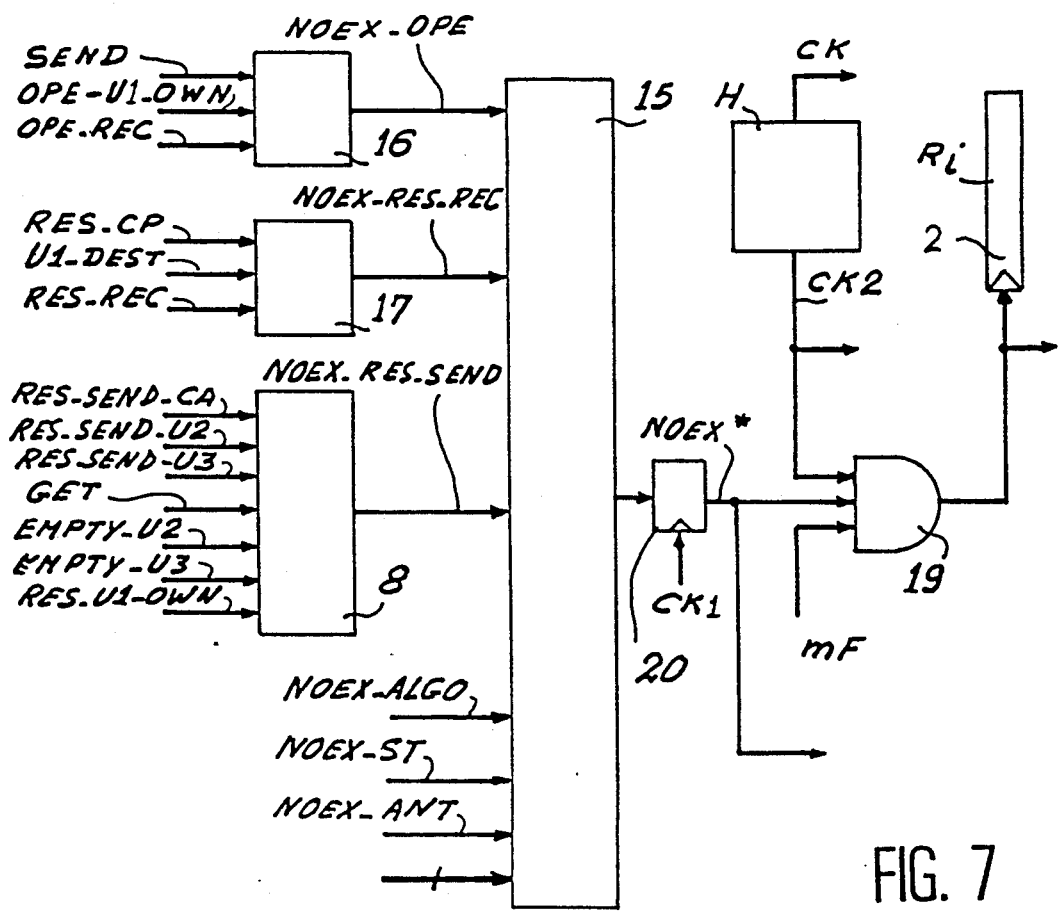
FIG. 7 shows the synchronization circuit of each processing unit.

At the onset of the ensuing phase 1, the microinstruction of register MW is decoded by the decoder 13, which at its output furnishes a set of microfunction signals enabling activation, during this phase or during the ensuing phase 2, of the operators and registers as a function of the microinstruction received. The signal mf applied in phase 2 to the input of the gate 19 of FIG. 7 shows one of these signals, by way of illustration. During this same phase 1, the unit receives interface signals from the other units and from the cache memory, in particular those signals that are to be taken into account by the circuit of FIG. 7 for synchronization.

Upon the appearance of the clock signal CK1, the registers synchronized with this signal can be loaded with their new value, to the extent that they are required in one of the microfunctions of the microinstruction. At the same instant, the multivibrator 20 is loaded with the logical value present at the output of the circuit 15.

In the absence of a nonexecution condition (NOEX* = 1), the multivibrator 20 then assumes the logical state 1, the consequence of which is to authorize the updating, if applicable, of the registers that are active in phase 2 upon the appearance of the next clock signal CK2. The microfunction mF is then said to be executable. Otherwise, the multivibrator 20 is at 0, and all the registers synchronized by CK2 are frozen.

This situation persists until such time as at least one of the nonexecution conditions is present. If the multivibrator is forced to the value of logical 1 in a later evaluation phase 1, thus signaling that all the execution conditions have been met, the set of registers synchronized with CK2 will be reauthorized to be modified during the ensuing phase 2. The execution phase 2 for the microinstruction that had been interrupted can thus be executed, and the new microinstruction is simultaneously loaded into the register MW.

Figure 8:
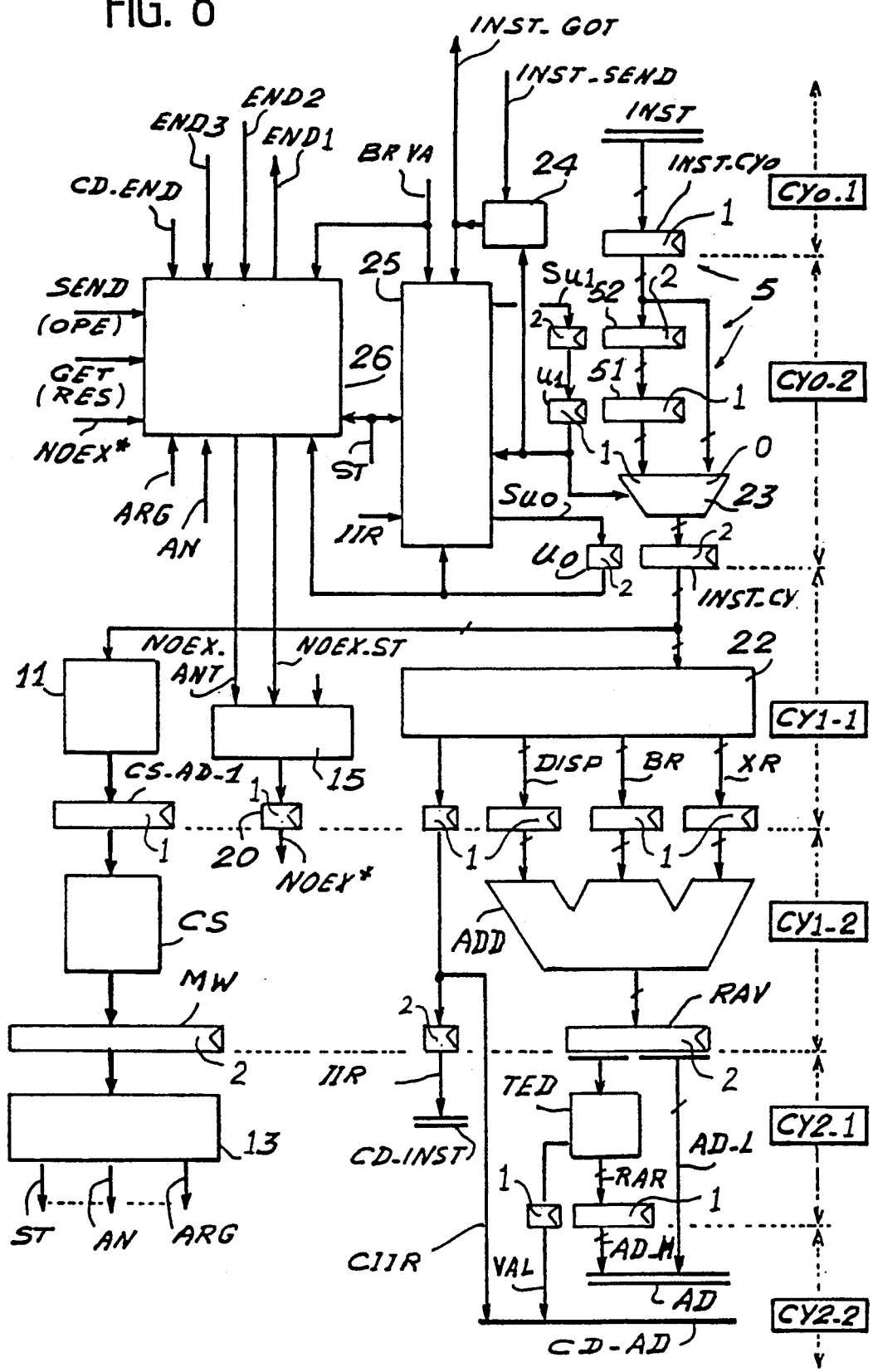
FIGS. 8 and 9, respectively, show various circuit details of the addressing unit and of the binary and decimal calculation unit.
Figure 9:
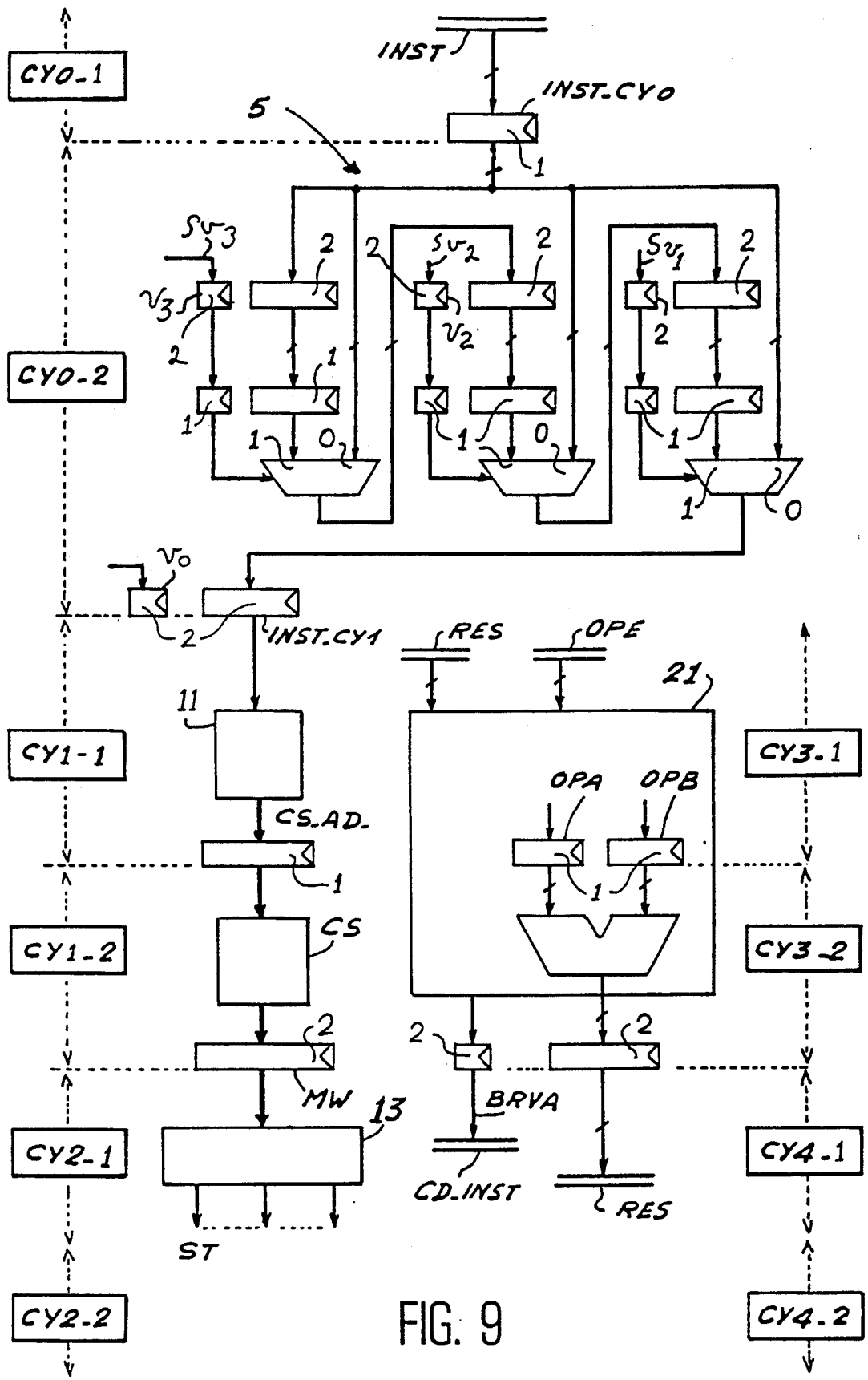

FIGS. 8 and 9 show certain circuits belonging to the addressing unit EAD and to the calculation unit BDP, in further detail. These figures will make it possible to explain the execution and chaining of instructions, in particular with the aid of the execution cycles and phases CY0-1, CY0-2, CY1-1, etc., shown.

FIG. 8 shows the microsequencer 11, the microprogram memory CS, the decoder 13 and the registers CS-AD-1 and MW already mentioned above in conjunction with FIG. 6. Also shown are the inhibition circuit 15 and the nonexecution command multivibrator 20. At the output of the decoder 13, three signals ST, AN, ARG are shown, respectively furnishing the indications for the end of a microprogram, anticipation, and transfer of control in the case of a transfer of control instruction.

FIG. 8 also shows a set of specific circuits for the addressing unit, in particular an adder ADD and a circuit 22 for instruction decoding and access to the registers BR, GR of the unit. When the instruction INST-CY1 requires addressing the memory, this instruction includes the indication of a base register number BR, a displacement value DISP, and in the case of addressing with indexing the identity of a general register GR. As a function of this information, the circuit 22 at its output furnishes the displacement value DISP and the contents BR, XR of the registers designated by the instruction. This information is locked in phase 1 in the corresponding registers. These registers serve as inputs to the adder ADD, the output of which furnishes the virtual address, which is loaded into a register RAV synchronized by CK2. The least-significant bits AD-L of the register RAV are transmitted to the cache memory over address lines AD, while the most significant bits of the register RAV are applied to the input of an address translation circuit TED, which at its output furnishes the most significant bits AD-H of the corresponding real address. The most significant bits AD-H are loaded into the register RAR synchronized by CK1. The register RAR is associated with a multivibrator that receives a validity indicator VAL for the address contained in the register RAR from the circuit TED.

When the instruction INST-CY1 requires a memory access, for example for loading instructions in the case of a transfer of control instruction, the circuit 22, in response to the operating code of the instruction, furnishes an instruction transfer initialization signal CIIR, evaluated in phase 1 and sent to the cache memory in the following phase 2. Analogous initialization signals IOR, IOW (not shown) will also be transmitted in the event of operand reading or result writing. In the case of instruction reading, a derived signal IIR is transmitted in the following phase 1 to the other units, by way of one of the lines CD-INST.

The register INST-CY1 is loaded from the instruction buffer 5 comprising registers 52 and 51 connected in cascade and synchronized by clock signals CK2 and CK1, respectively. A multiplexer 23 with two inputs is connected at its respective inputs to the output of a register INST-CY0 and of the register 51. The input of the register INST-CY0 is connected to the instruction bus INST. The registers 52, 51 and INST-CY1 are each associated with one validity multivibrator. The state of these multivibrators is commanded by a logical command circuit 25 for commanding the instruction buffer. As a function of the signals INST-GOT, BRVA, ST, IIR, of the state of the multivibrator associated with the register 51 and of the multivibrator u0 associated with the register INST-CY, the circuit 25 furnishes signals for updating Su0 and Su1 of the multivibrators u0 and u1, respectively. This updating takes place in phase 2, as a function of signals evaluated in the preceding phase 1. When they are at 1, these multivibrators make it possible to indicate that the registers contain valid instructions. The multivibrator associated with register 51 commands the multiplexer 23 in such a way as to put the input of the register INST-CY1 in communication with the output of either register 51 or register INST-CY0, depending on whether its state is 1 or 0.

As a function of the signal INST-SEND and the state of the multivibrator associated with the register 51, a circuit 24 furnishes the signal INST-GOT to signal to the cache memory that the sending of an instruction, notified by INST-SEND, has been effectively loaded into the instruction buffer 5.

Finally, FIG. 8 shows an instruction control circuit 26 that receives the signals ST, AN, ARG, END2, END3, defined above, as well as a conditional end signal CD-END and the signals SEND and GET issued by the cache memory. As a function of these signals, the circuit 26 delivers the end-of-microprogram signal END1 to the other units and the nonexecution signals NOEX-ST and NOEX-ANT, applied to the input of the inhibition circuit 15. A more detailed description of the circuit 26 will be given in conjunction with FIG. 10.

Analogously, FIG. 9 shows some details of the circuitry of the unit BDP. The same reference symbols are used as for EAD, with the various registers INST-CY0, INST-CY1, CS-AD-, MW, and the microsequencer 11, the microprogram memory CS and the decoder 13. Reference numeral 21 represents the data path, which is symbolized by an adder the inputs of which are connected to two operand registers OPA, OPB and the output of which is connected to a result register, which in turn is connected to the result bus RES.

In the exemplary embodiment described, calculation of the transfer of control conditions is performed in BDP. Consequently, in the case where the instruction executed is a transfer of control instruction, the data path 21 furnishes a signal BRVA signaling whether the transfer of control condition is met. The signal BRVA is evaluated as a function of the type of transfer of control defined by the instruction and parameters contained in a state register of the unit.

Unlike the situation in the address unit, the instruction buffer 5 of BDP includes a greater number of registers and multiplexers. This number will be a function of the number of instructions that EAD can execute in anticipated fashion with respect to BDP. Thus in the example of FIG. 9, BDP can receive three instructions in execution standby, that is, two more than EAD. As in the case of EAD, the various instruction buffer registers are associated with validity multivibrators v1, v2, v3, updated respectively by the signals Sv1, Sv2, Sv3 issued by a command circuit of the instruction buffer, not shown. The register INST-CY1 is also associated with a validity multivibrator v0 updated by the signal Sv0 furnished by this same command circuit.

Before the function of the circuit 25 for commanding the instruction buffer and the circuit 26 for commanding instructions in EAD are described, a quick description of the various steps in execution of an instruction requiring the use of a plurality of units is appropriate. To simplify this explanation, the assumption is that the instruction is short and that only the addressing unit EAD and the calculating unit are involved. FIGS. 8 and 9 will be looked at simultaneously, which show the correspondence between the steps or cycles CY0, CY1, CY2, CY3 and CY4 for execution of such an instruction, along with the portions of the circuit that are required in this execution. As shown, each cycle, such as CY0, is subdivided into two phases, for example CY0-1 and CY0-2, respectively synchronized by the clock signals CK1 and CK2.

When the execution of a program is in progress, the cache memory furnishes a succession of instructions in parallel in response to a command for initializing instruction reading CIIR triggered by a transfer of control instruction executed by EAD. Sending of an instruction by the cache memory is signaled by the signal INST-SEND accompanying the data over the instruction bus INST. During the phase CY0-1, the instruction is received simultaneously in the registers INST-CY0 of the units. In the course of the next phase CY0-2, the instruction that has just been received is loaded into the instruction buffers 5 of the units, on the condition that these buffers are not full, or in other words that the validity multivibrator of the register 51 is at 0. If that should not be the case, then the signal INST-GOT furnished by the circuit 24 is at 0, thus signaling to the cache memory that the instruction received was not taken into account by the units, which has the effect of interrupting the sending of the next instruction in the cache memory. On the other hand, if the buffer 5 is not full, then the instruction received is loaded into either the register 52 of the buffer, which sets the multivibrator u1 to 1, or the register INST-CY1, in the event that this register is empty or becomes free. In the course of the next phase CY1-1, the instruction is decoded both by the microsequencer 11 and by the hard-wired part 22, with the effect that the address CS-AD-1 of the first microinstruction is calculated and access is gained, for example, to a base register BR and a general register GR with a view to performing an address development. In the case where EAD is not in the anticipated state, BDP performs the analogous operations for the same instruction.

The explanation will now be continued taking the example of an instruction that requires searching for an operand in memory and an operation such as addition bearing on this operand and performed by BDP. In this case, BDP will assume the nonexecution state (NO-EX=1), because the operand is expected.

In the course of the next phase CY1-2, the register MW is loaded with the microinstruction to be executed, while in the example in question the register RAV receives the virtual address calculated by the adder ADD from the contents BR and XR of the registers. During this period of time, EAD sends an operand reading initialization signal to the cache memory, while BDP is in the nonexecution state.

In the course of phase CY2-1, EAD loads the register RAR with the most significant bits AD-H of the real address (assuming that the address translation circuit TED is capable of furnishing the real address sought in a single phase). During this same phase, the least significant bits AD-L of the virtual address are sent to the cache memory. BDP also re-evaluates its execution conditions.

In the course of phase CY2-2, the cache memory takes into account the real address furnished by EAD, while BDP continues to be in the nonexecution state.

If the cache memory is capable of furnishing the necessary operand to BDP during the next cycle CY3-1, it signals this fact to the units via SEND, and BDP is then returned to the execution state. The result is that the phase CY3-2 following is executed, and the result is loaded into a corresponding register.

During phase CY4-1, the result calculated is sent over the result bus RES.

In the course of the next phase CY4-2, the addressee unit or units for the information calculated during the previous phase perform the retrieval of this information.

Contrarily, if the instruction is one for conditional transfer of control, the transfer of control validation signal BRVA will be produced at the end of phase CY1-2 of the next instruction. In the case of effective transfer of control (BRVA=1), EAD will continue its microprogram, in particular to calculate the address of the transfer of control instruction.

The function that has been described above for a particular case shows that the addressing unit has completed its contribution to the execution of the instruction upon the end of phase CY2-1. As a result, the corresponding microprogram is completed (in this case the microprogram includes only a single microinstruction). Consequently, at the end of phase CY2-1, EAD will be capable of beginning to execute the next instruction. If the program is executed without any rerouting, the next instruction is the one that is present in the register INST-CY1. This possibility is exploited by the present invention by providing the possibility, in the last microinstruction of each microprogram, of including an end-of-microprogram indication, and the cases where this is possible, an anticipation indication, to signal that the execution of the next instruction can begin. Nevertheless, it should be noted here that the effective execution of the next anticipated instruction must be subjected to certain conditions that will be described in detail in conjunction with FIGS. 10 and 11.

The circuit 25 for commanding the instruction buffer is designed to function as follows:

1) If the signals IIR and BRVA are present simultaneously, this means that the transfer of control calculated by BDP is valid; that is, the instructions are no longer executed in order. In this case, the circuit 25 sets the multivibrators u0 and u1 to 0. The same is true for the other units, or all the instructions contained in the instruction buffer must be invalidated.

2) In the absence of a valid transfer of control, if no new instruction has been sent by the cache memory (INST-SEND=0), two cases are possible:
   if EAD does not effectively begin a new instruction, the multivibrators are kept in the same state;
   otherwise, the instruction perhaps contained in the register 51 is loaded into the register INST-CY1, and the multivibrator u1 is reset to 0.

3) In the absence of a valid transfer of control, and if a new instruction is sent (INST-SEND=1), four cases are possible:
   if the buffer is full (u1=1) and if EAD is not effectively beginning a new instruction, the signal INST-GOT is at 0, and the multivibrators are kept in the same state;
   if the buffer is full and EAD is beginning the execution of a new instruction, the instruction received is loaded into the register 52, and the multivibrator u1 is kept at 1;
   if the buffer is not full and if EAD is not beginning to execute a new instruction, the instruction received is loaded into the register 52, with the associated multivibrator u1 being set at 1;
   if the buffer is not full and if EAD is beginning to execute a new instruction, the multivibrator u1 is kept at 0, the new instruction is loaded into the register INST-CY1, and the multivibrator u0 is kept at 1.

With the aid of the above description, it is no problem whatever for one skilled in the art to embody the circuit 25. Hence there is no need to describe it in further detail. It will be appropriate merely to state that the effective beginning of an instruction is determined as a function of the signal ST and SQ, which will now be defined more precisely.

The instruction buffer command circuit of the other units is designed analogously:
   the state of the buffer is maintained unchanged if no new instruction has been sent and if the unit is not beginning any instruction;
   otherwise, incrementing of the buffer;
   if a new instruction is sent, it is loaded into the buffer, if the buffer is not full, and incrementing of the buffer takes place if the unit is beginning to execute a new instruction.

Figure 10:
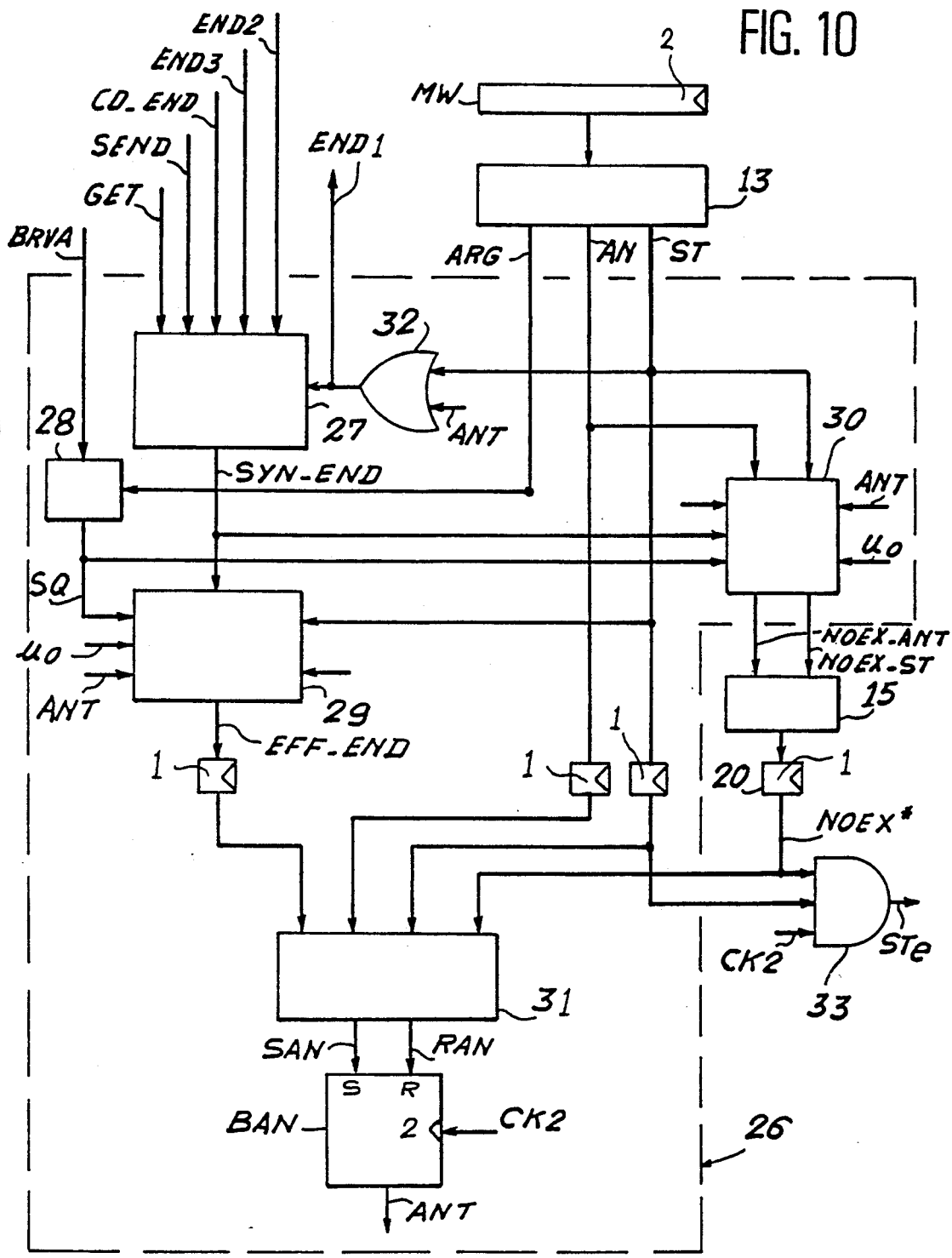
FIG. 10 shows the means for command of instructions of a unit capable of functioning in the anticipated mode.

FIG. 10 shows an embodiment of the instruction command circuit 26 that can be used in a unit capable of executing instructions in the anticipated mode.

The circuit 26 first receives the internal signals ST, AN, ARG obtained after decoding 13 of the microinstruction MW. The circuit also receives external signals originating in other units or in the cache memory. The signals END2 and END3 are the end-of-instruction signals of the other two units U2, U3, respectively. The signal CD-END is used in the case where the option of a conditional end of the microprogram is provided in an instruction in a unit. This conditional end mechanism is used when a unit begins to execute the last microinstruction while this microinstruction has not been completely executed except after an operation performed by the cache memory. Two cases are possible here: Either the cache memory must take a result into account, or it must send an operand. The effective execution of these operations is signaled by the reception of the signal GET or the signal SEND, respectively, sent by the cache memory.

Finally, the circuit 26 receives the signal BRVA furnished by the unit that performs the transfer of control calculations.

At its output, the circuit 26 furnishes two inhibition signals NOEX-ST and NOEX-ANT, which are applied to the inhibition circuit 15. The circuit 26 shown in FIG. 10 corresponds to a simplified embodiment, where the unit can anticipate no more than one instruction. Modifications to be made to increase the number of instructions executed in the anticipated mode will be discussed later.

The circuit 26 includes a multivibrator BAN, the state ANT of which indicates the anticipated or nonanticipated state of the unit. For example, ANT=0 can signify that the unit is not in the anticipated mode, that is, it is in progress in the execution of the same instruction as the other units. Conversely, if ANT=1, the unit has already begun the instruction, while the preceding instruction is still being executed in at least one another unit.

As a function of this anticipated state indicator ANT and the end-of-microinstruction indicator ST, the OR gate 32 furnishes the end-of-microprogram signal END1, in accordance with the following logical equation:

$$END1 = ANT + ST$$

The signals END2 and END3 are processed analogously in the other units, and is understood that for a unit U2 incapable of functioning in the anticipated mode, the following always applies:

$$END2 = ST$$

As a function of the end-of-microprogram signals ST, the conditional end signal CD-END, and the SEND and GET signals sent by the cache memory, the end-of-instruction detection circuit 27 furnishes the end-of-instruction signal SYN-END, verifying the following equation:

$$SYN\text{-}END = END1 \cdot END2 \cdot END3 \cdot [(CD\text{-}END)^* + SEND + GET]$$

As a function of the transfer of control indicator ARG and of the valid transfer of control signal BRVA, the circuit 28 furnishes a signal SQ, for executing instructions in order and having the following meaning:
- if SQ=1, the transfer of control condition is not met; this means that the program is elapsing in order and consequently that the next instruction is the first instruction in standby in the instruction buffer. This is also the case when a transfer of control instruction is not involved;
- if SQ=0, there is a break in the order, which implies that the transfer of control instruction that was just executed is not completed, because the addressing unit EAD must continue its microprogram to calculate the address of the next instruction.

The effective-end-of-instruction detection circuit 29, as a function of the signal ST, SYN-END, SQ, u0, ANT, furnishes an effective-end-of-instruction signal EFF-END in accordance with the following logical equation:

$$EFF\text{-}END = (SYN\text{-}END) \cdot (ANT + SQ \cdot ST \cdot u0)$$

The signal EFF-END and the signals AN and ST are locked in phase 1 in the corresponding multivibrators. The outputs of these multivibrators, and the signal NOEX*, are applied to the input of a circuit 31 for commanding the multivibrator BAN. The circuit 31 furnishes the signals SAN and RAN, respectively commanding that the multivibrator BAN be set to one and to zero. The signals for commanding the multivibrator BAN verify the following equations:

$$SAN = ST \cdot AN \cdot NOEX^* \cdot (EFF\text{-}END)^*$$

$$RAN = (ST \cdot AN \cdot NOEX^*)^* \cdot (EFF\text{-}END)^*$$

An anticipation circuit 30 receives the signals ST, AN, SYN-END, SQ, ANT, u0, and furnishes two nonexecution signals NOEX-ST and NOEX-ANT verifying the following logical equations:

$$NOEX\text{-}ST = ST \cdot AN^* \cdot [ANT + (SYN\text{-}END)^* + SQ \cdot u0^*] + ST \cdot AN \cdot u0^*$$

$$NOEX\text{-}ANT = ANT \cdot (SYN\text{-}END)^*$$

The NOEX-ST equation shows that the last cycle of an instruction cannot be executed if the next instruction is not present in the register INST-CY0 (the case where u0=0).

Embodiment by means of logic circuits and the functioning of the circuit 26 will be readily apparent from the above equations. Nevertheless, it may be useful to make some explanation on the meaning of the intermediate signals produce by this circuit. The signal SYN-END informs the unit that three microprograms executed in the three units are ready to be completed or have already been completed, on the condition, in the case of a branch instruction, that no rerouting has occurred.

The effective-end-of-instruction signal EFF-END indicates that the next instruction has already begun (ANT=1) or that it will now be executed because it is present in the instruction buffer (SQ·ST·u0=1).

The nonexecution condition NOEX-ST prevents the execution of the instruction in standby in the following cases:
- the next instruction is not executable in anticipated fashion (ST·AN*=1) and the unit is in the anticipated state (ANT=1), or the three microprograms of the preceding instruction are not completed (SYN-END=0), or no rerouting has occurred and the instruction in standby in the instruction buffer is not valid (SQ·u0*=1);
- the next instruction is executable in anticipated fashion (ST·AN=1) and the instruction in standby in the instruction buffer is not valid (u0=0).

The nonexecution condition NOEX-ANT corresponds to the case where the unit is already in anticipation (ANT=1) while the microprograms of an instruction are not simultaneously completed in the units (SYN-END=0).

To enable a unit to anticipate a plurality of instructions, the multivibrator BAN must be replaced with a circuit including a counting means, such as an up-down counter CAN synchronized with CK2 and incremented by the signal SAN and decremented by the signal RAN. The output of the counter CAN is connected on the one hand to a zero state detector of the counter furnishing the anticipated state indicator ANT and on the other hand to a maximum count detector furnishing a signal MAN indicating that the state of the counter has reached a predetermined number. The signal NOEX-ANT must then verify the following equation:

$$NOEX\text{-}ANT = MAN \cdot (SYN\text{-}END)^*$$

Figure 11:
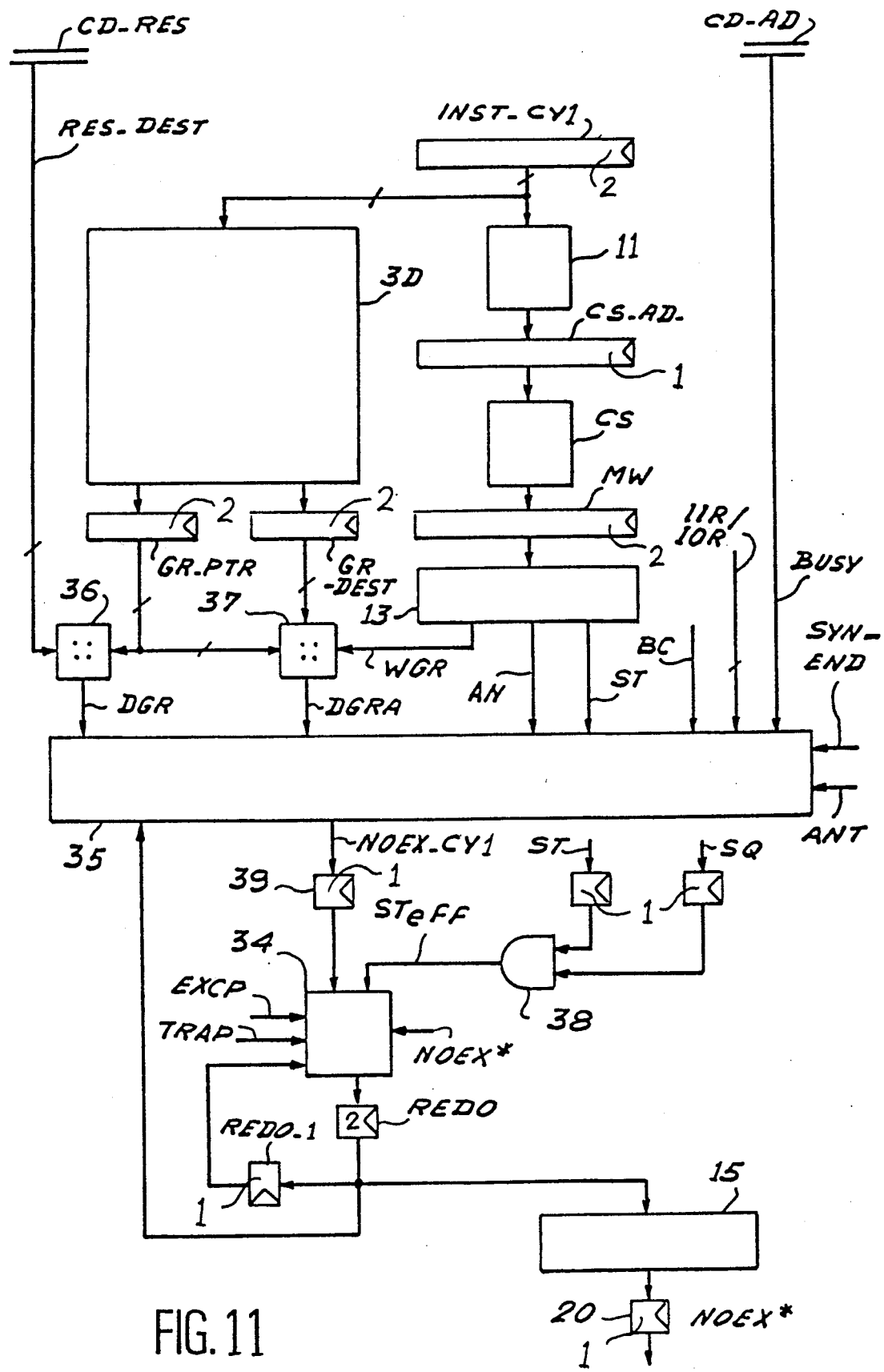
FIG. 11 shows a circuit of the addressing unit for the detection and management of dependency conditions.

FIG. 11 shows a specific circuit of the addressing unit EAD. This circuit is intended to solve the problems of dependency between an instruction, the execution of which can begin in the addressing unit, but which can use information not yet available. This situation arises in the following cases:
- the instruction requires a reading (for example of instructions) in the cache memory (IIR) when the cache memory is not free (BUSY=1);
- the instruction is a conditional transfer of control instruction and is to be executed in anticipated fashion;
- the instruction requires the reading of a register capable of being modified by a preceding instruction.

The busy state of the cache memory while reading in it must be performed is signaled on the one hand by the busy signal BUSY furnished by the cache memory via one of the control lines CD-AD and on the other hand by a signal IIR or IOR obtained by decoding of the instruction in the units. This signal corresponds either to an instruction reading command IIR or an operand reading command IOR. Similarly, the presence of a conditional transfer of control instruction is signaled by the signal BC obtained by decoding the instruction.

The cases of dependency at the level of the registers are handled by a circuit 3D for detecting the reading or writing of a register. Depending on the operating code of the instruction contained in the register INST-CY1, the circuit 3D detects whether this instruction requires reading or writing of a predetermined register. If it requires reading, then the circuit 3D extracts the identity of the register from the instruction and loads it into the register GR-PTR. If it requires writing, then the identity of the register is loaded into the register GR-DEST. Additionally, when an instruction requires writing in a register, this information is encoded in the last microinstruction of the corresponding microprogram in EAD, and the decoder 13 furnishes a corresponding signal WGR.

A first case of dependency is that in which the microprogram of an instruction requiring writing in a register is ended (WGR=1) while the next instruction executed in anticipation requires the reading of the same register (GR-DEST=GR-PTR). This situation is detected by the comparator 37, which then furnishes the signal DGRA.

Another case of dependency is that in which the register GR-PTR coincides with the identity RES-DEST of a register the updating of which in the unit is to be performed in the next cycle. This case is detected by the comparator 36, which furnishes the signal DGR.

The signals IIR, BC, DGRA, DGR which have just been defined, and the signals ST, AN BUSY, ANT, SYN-END, and the state of a multivibrator REDO, which will be defined below, are applied to the input of a logic circuit 35 for detecting dependency, which furnishes the dependency signal NOEX-CY1 verifying the following logical equation:

$$NOEX\text{-}CY1 = BUSY \cdot IIR + (ST + REDO) \cdot DGR + ST \cdot AN \cdot [ANT + (SYN\text{-}END)^*] \cdot REDO^* \cdot (DGRA + BC) + REDO \cdot ANT \cdot (SYN\text{-}END)^*$$

The actual embodiment of the logic circuit 35 is entirely conventional, however, and hence will not be described in detail.

Both the dependency signal NOEX-CY1 and the signals ST and SQ are locked in phase 1 in the corresponding multivibrators. The signals ST and SQ, by way of an AND gate 38, furnish the signal STeff signaling that the instruction in standby in the register INST-CY1 is indeed the next instruction, and that the microprogram of the instruction in progress in the unit is ended.

A multivibrator REDO synchronized by CK2 receives at its input the signal furnished by a logic circuit 34. The output of the multivibrator REDO is connected both an input of the inhibition circuit 15 and to the input of a multivibrator REDO-1 locked in phase 1. At its input, the circuit 34 receives the signals NOEX-CY1, STeff and NOEX*, as well as the output signal of the multivibrator REDO-1. It also receives the signals EXCP and TRAP for interruption of the program in progress. At its output, the circuit 34 furnishes a logic signal defining the new state of the multivibrator REDO in accordance with the following equation:

$$REDO = (NOEX\text{-}CY1) \cdot [STeff \cdot NOEX^* + (REDO\text{-}1) \cdot TRAP^* \cdot EXCP^*]$$

Once again, the embodiment of the logic circuit 34 requires no particular explanation here.

The circuit of FIG. 11 functions as follows. When a condition of potential dependency is detected by one of the signals BUSY, BC, DGRA, DGR, and this dependency is confirmed by the signals IIR, ST, REDO, AN, ANT and SYN-END, the circuit 35 furnishes the dependency signal NOEX-CY1, which forces the multivibrator REDO to 1 as soon as the first microinstruction of the instruction involved is loaded into the register MW. As long as the multivibrator REDO is at 1, the inhibition circuit 15 keeps the unit in the nonexecution state, and this situation lasts as long as the dependency signal NOEX-CY1 remains at 1, on the condition that there is no interruption to the program. As soon as NOEX-CY1 returns to 0, the multivibrator REDO is reset to 0 in the following phase.

It is understood that multiple variants of the embodiments described above are possible by using equivalent means, without departing from the scope of the present invention.

We claim:

1. A processor for a data processing system including a plurality of microprogrammed processing units (EAD, BDP, FPP), sharing a set of functions of said processor, each unit being assigned to execute a subset of functions of said processor, said units being connected to memory means (CA) containing program instructions to be executed and the operands, at least one of said units being an addressing unit (EAD) for addressing said memory means (CA) for obtaining said program instructions and said operands, wherein each of said processing units (EAD, BDP, FPP) includes a command block means (1) for the execution of specific microprograms, wherein said program instructions each include a plurality of microprograms that can be executed respectively in said units, said command block means (1) of each unit including means (26, 15, 33) for ordering instructions to trigger the execution of the microprogram of a waiting first instruction, wherein each of said microprogram includes a last microinstruction having an end-of-microprogram indication (ST) and an anticipation indication signal (AN); and further wherein at least said addressing unit includes anticipation means (30) for conditioning said command means, said addressing unit containing said microprograms, the last microinstruction of which includes an anticipation indication signal (AN) to determine whether an instruction in standby to be executed can be anticipated by beginning execution thereof prior to completion of a currently executing instruction; said anticipation means (30) being operable to condition said command means (26, 15, 33) to authorize the execution of said microprogram of said instruction in standby when a currently executing microinstruction includes said end-of-microprogram and anticipation indications (ST, AN).

2. The processor of claim 1, and further including means (CD-INST, 32) for enabling said units to exchange end-of-microprogram signals (END1, END2, END3) in response to said end-of-microprogram indications (ST); wherein each unit includes and end-to-instruction detection circuit (27) furnishing an end-of-instruction signal (SYN-END) as a function of said end-of-microprogram signals (END1, END2, END3);

each unit further including an inhibition circuit (15) having an active and an inactive state wherein said active state prevents any modification of a logic state of the unit; said inhibition circuit (15) being made active when:
- said anticipation indication (AN) is absent;
- said end-of-microprogram indication (ST) is present; and
- said end-of-instruction signal is absent;

and further wherein said instruction in standby is "executable" if said end-of-microprogram indication (ST) is present while said inhibition circuit (15) is inactive.

3. The processor of claim 2, wherein each unit provided with said anticipation means (30) further includes an anticipated state indicator (ANT) capable of assuming a first or a second predetermined value, said anticipated state indicator (ANT) initially assuming the first predetermined value, and wherein the second predetermined value signals that an instruction in progress in said unit is executed in anticipation, such that the execution of said instruction in progress has begun before a previous instruction has been completed; and an effective-end-of-instruction detector circuit (29), furnishing an effective-end-of-instruction signal (EFF-END) when:
- said end-of-instruction signal (SYN-END) is present; and
- said unit is in an anticipated state, or the instruction in standby in said unit is determined to be a next instruction to be executed;

and further wherein said anticipated state indicator (ANT) is put at said predetermined second value when:
- said instruction in standby is executable;
- said anticipation indication (AN) is present; and
- said effective-end-of-instruction signal (EFF-END) is absent;

and further wherein the inhibition circuit (15) is made active when:
- said end-of-microprogram indication (ST) is present;
- said anticipation indication (AN) is absent; and
- said anticipated state indicator (ANT) has said second predetermined value.

4. The processor of claim 3, wherein said first and second predetermined values of said anticipated state indicator (ANT) correspond to a first and second state, respectively, of a multivibrator (BAN); said multivibrator (BAN) being arranged to return to its first state when said effective-end-of-instruction signal (EFF-END) is present while either the next instruction is not anticipatable or the instruction in standby is not executable; and further wherein said inhibition circuit means (15) is rendered active when said multivibrator (BAN) is in its second state while said end-of-instruction signal (SYN-END) is absent.

5. The processor of claim 3, wherein each unit provided with anticipation means (30) includes a device for counting (CAN) the number of instructions executed in anticipation by said unit; said first and second predetermined values of said anticipated state indicator (ANT) corresponding respectively to an initial value of the device for counting (CAN) and a different value from said initial value; and wherein said inhibition circuit (15) is rendered active when said number of instructions executed in anticipation attains a predetermined value while said end-of-instruction signal (SYN-END) is absent.

6. The processor of claim 5, wherein the device for counting (CAN) is incremented by one when:
- the instruction in standby is executable;
- said anticipation indication (AN) is present; and
- said effective-end-of-instruction signal (EFF-END) is absent;

and further wherein the device for counting (CAN) is decremented by one when said effective-end-of-instruction signal (EFF-END) is present while either a next instruction is not executable in anticipation or the instruction in standby is not executable.

7. The processor of claim 2, wherein said addressing unit (EAD) includes dependency detection circuit means (35, 36, 37) for furnishing a dependency signal (NOEX-CY1) when the instruction in standby must use information capable of being modified by an instruction that has not yet been completed in at least one of the units other than the addressing unit; said dependency signal (NOEX-CY1) conditioning the activation of said inhibition circuit (15) and the activation of said inhibition circuit (15) being cancelled when said dependency signal (NOEX-CY1) disappears.

8. The processor of claim 3, wherein said addressing unit (EAD) includes dependency detection circuit means (35, 36, 37) for furnishing a dependency signal (NOEX-CY1) when the instruction in standby must use information capable of being modified by an instruction that has not yet been completed in at least one of the units other than the addressing unit; said dependency signal (NOEX-CY1) conditioning the activation of said inhibition circuit (15) and the activation of said inhibition circuit (15) being cancelled when said dependency signal (NOEX-CY1) disappears.

9. The processor of claim 4, said addressing unit (EAD) includes dependency detection circuit means (35, 36, 37) for furnishing a dependency signal (NOEX-CY1) when the instruction in standby must use information capable of being modified by an instruction that has not yet been completed in at least one of the units other than the addressing unit; said dependency signal (NOEX-CY1) conditioning the activation of said inhibition circuit (15) and the activation of said inhibition circuit (15) being cancelled when said dependency signal (NOEX-CY1) disappears.

10. The processor of claim 5, said addressing unit (EAD) includes dependency detection circuit means (35, 36, 37) for furnishing a dependency signal (NOEX-CY1) when the instruction in standby must use information capable of being modified by an instruction that has not yet been completed in at least one of the units other than the addressing unit; said dependency signal (NOEX-CY1) conditioning the activation of said inhibition circuit (15) and the activation of said inhibition circuit (15) being cancelled when said dependency signal (NOEX-CY1) disappears.

11. The processor of claim 6, wherein said addressing unit (EAD) includes dependency detection circuit means (35, 36, 37) for furnishing a dependency signal (NOEX-CY1) when the instruction in standby must use information capable of being modified by an instruction that has not yet been completed in at least one of the units other than the addressing unit; said dependency signal (NOEX-CY1) conditioning the activation of said inhibition circuit (15) and the activation of said inhibition circuit (15) being cancelled when said dependency signal (NOEX-CY1) disappears.

12. The processor of claim 7, wherein transfer of control conditions of a conditional transfer of control instruction are calculated by a unit other than the addressing unit, and said dependency signal (NOEX-CY1)

is produced by detecting that an instruction in standby is a conditional transfer of control instruction while conditions for executing the conditional transfer of control instruction in anticipation are present.

13. The processor of claim 8, wherein transfer of control conditions of a conditional transfer of control instruction are calculated by a unit other than the addressing unit, and said dependency signal (NOEX-CY1) is produced by detecting that an instruction in standby is a conditional transfer of control instruction while conditions for executing the conditional transfer of control instruction in anticipation are present.

14. The processor of claim 9, wherein transfer of control conditions of a conditional transfer of control instruction are calculated by a unit other than the addressing unit, and said dependency signal (NOEX-CY1) is produced by detecting that an instruction in standby is a conditional transfer of control instruction while conditions for executing the conditional transfer of control instruction in anticipation are present.

15. The processor of claim 10, wherein transfer of control conditions of a conditional transfer of control instruction are calculated by a unit other than the addressing unit, and said dependency signal (NOEX-CY1) is produced by detecting that an instruction in standby is a conditional transfer of control instruction while conditions for executing the conditional transfer of control instruction in anticipation are present.

16. The processor of claim 11, wherein transfer of control conditions of a conditional transfer of control instruction are calculated by a unit other than the addressing unit, and said dependency signal (NOEX-CY1) is produced by detecting that an instruction in standby is a conditional transfer of control instruction while conditions for executing the conditional transfer of control instruction in anticipation are present.

17. The process or claim 7, wherein said addressing unit (EAD) includes registers (BR, GR) capable of being modified by units other than the addressing unit, said dependency signal (NOEX-CY1) being produced by detecting that the instruction in standby requires the reading of one of said registers while the contents of said registers, modifiable by an instruction not yet completed, have not been received in said addressing unit (EAD).

18. The process or claim 12, wherein said addressing unit (EAD) includes registers (BR, GR) capable of being modified by units other than the addressing unit, said dependency signal (NOEX-CY1) being produced by detecting that the instruction in standby requires the reading of one of said registers while the contents of said registers, modifiable by an instruction not yet completed, have not been received in said addressing unit (EAD).

19. The processor of claim 7, further including a multivibrator (REDO), the activation of said inhibition circuit (15) being commanded by a first state of said multivibrator (REDO); said multivibrator being placed in a first predetermined state when:

said end-of-microprogram indicator (ST) is present; and the instruction in standby is the next instruction and is executable;

and further wherein said multivibrator (REDO) is placed in a second state when said dependency signal (NOEX-CY) has disappeared, or in the event of interruption of execution of a program in progress.

20. The processor of claim 12, further including a multivibrator (REDO), the activation of said inhibition circuit (15) being commanded by a first state of said multivibrator (REDO); said multivibrator being placed in a first predetermined state when:

said end-of-microprogram indicator (ST) is present; and the instruction in standby is the next instruction and is executable;

and further wherein said multivibrator (REDO) is placed in a second state when said dependency signal (NOEX-CY) has disappeared, or in the event of interruption of execution of a program in progress.

21. The processor of claim 17, further including a multivibrator (REDO), the activation of said inhibition circuit (15) being commanded by a first state of said multivibrator (REDO); said multivibrator being placed in a first predetermined state when:

said end-of-microprogram indicator (ST) is present; and the instruction in standby is the next instruction and is executable;

and further wherein said multivibrator (REDO) is placed in a second state when said dependency signal (NOEX-CY) has disappeared, or in the event of interruption of execution of a program in progress.

* * * * *

UNITED STATES PATENT AND TRADEMARK OFFICE
CERTIFICATE OF CORRECTION

PATENT NO. : 5,299,318
DATED : March 29, 1994
INVENTOR(S) : BERNARD et al

It is certified that error appears in the above-indentified patent and that said Letters Patent is hereby corrected as shown below:

Col. 24, line 45 (Claim 1, line 19) "microprogram" should be --microprograms--.

Col. 25, line 62 (Claim 5, line 8) "circuit" should be --means--.

Signed and Sealed this

Twenty-ninth Day of November, 1994

Attest:

BRUCE LEHMAN

*Attesting Officer*       *Commissioner of Patents and Trademarks*